US010041462B2

(12) United States Patent
Hashimoto

(10) Patent No.: US 10,041,462 B2
(45) Date of Patent: Aug. 7, 2018

(54) ELECTRIC DRIVE VEHICLES

(71) Applicant: Toyota Jidosha Kabushiki Kaisha, Toyota-shi, Aichi-ken (JP)

(72) Inventor: Toshiya Hashimoto, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 502 days.

(21) Appl. No.: 14/726,870

(22) Filed: Jun. 1, 2015

(65) Prior Publication Data

US 2016/0006377 A1    Jan. 7, 2016

(30) Foreign Application Priority Data

Jul. 3, 2014   (JP) .................. 2014-137957

(51) Int. Cl.
*B60L 3/10*   (2006.01)
*F02N 11/08*   (2006.01)
(Continued)

(52) U.S. Cl.
CPC ............ *F02N 11/0866* (2013.01); *B60L 3/12* (2013.01); *B60L 11/126* (2013.01); *B60L 11/14* (2013.01); *B60L 11/1861* (2013.01); *B60L 11/1868* (2013.01); *B60L 2210/12* (2013.01); *B60L 2210/14* (2013.01); *B60L 2240/22* (2013.01); *B60L 2240/423* (2013.01); *B60L 2240/429* (2013.01); *B60L 2240/526* (2013.01); *B60L 2240/527* (2013.01); *B60L 2240/529* (2013.01); *B60L 2240/545* (2013.01); *B60L 2240/547* (2013.01); *B60L 2250/26* (2013.01); *B60L 2260/44* (2013.01); *F02N 11/04* (2013.01); *F02N 2011/0877* (2013.01); *F02N 2011/0888* (2013.01); *F02N 2011/0896* (2013.01);
(Continued)

(58) Field of Classification Search
CPC .................................................. Y10T 307/653
See application file for complete search history.

(56) References Cited

U.S. PATENT DOCUMENTS 3,182,742 A * 5/1965 Dow ........................ B60K 1/00
                                                       180/14.1
3,530,356 A * 9/1970 Aronson ............... H02J 7/1446
                                                       180/65.31
(Continued)

FOREIGN PATENT DOCUMENTS

CN        103141019 A     6/2013
JP        2009183108 A    8/2009
(Continued)

*Primary Examiner* — Fritz M Fleming
(74) *Attorney, Agent, or Firm* — Dinsmore & Shohl LLP

(57) ABSTRACT

An electric drive vehicle which is capable of performing a bidirectional voltage conversion between two DC power supplies and a rotary electric machine, and a connection switch between a series connection and a parallel connection of the two power supplies with respect to the rotary electric machine. The electric drive vehicle can supply electric power without a delay in response to a change in a load request. A controller sets the connection between the two power supplies to the parallel connection when an estimated value of an output electric current in accordance with a torque command to the rotary electric machine exceeds a tolerable electric current value of at least one of the two power supplies.

7 Claims, 25 Drawing Sheets

(51) Int. Cl.
  *B60L 3/12*     (2006.01)
  *B60L 11/12*    (2006.01)
  *B60L 11/14*    (2006.01)
  *B60L 11/18*    (2006.01)
  *F02N 11/04*    (2006.01)

(52) U.S. Cl.
  CPC .......... *Y02T 10/6217* (2013.01); *Y02T 10/642* (2013.01); *Y02T 10/7005* (2013.01); *Y02T 10/7044* (2013.01); *Y02T 10/7066* (2013.01); *Y02T 10/7077* (2013.01); *Y02T 10/7225* (2013.01); *Y02T 10/7233* (2013.01); *Y02T 10/84* (2013.01)

(56) References Cited

U.S. PATENT DOCUMENTS 3,923,116 A * 12/1975 Thomspon .............. B60L 15/04
                                                  105/50
2013/0134786 A1    5/2013 Ishigaki et al.

FOREIGN PATENT DOCUMENTS

| JP | 2010-057288 A    | 3/2010  |
| JP | 2012-070514 A    | 4/2012  |
| JP | 2013-077452 A    | 4/2013  |
| JP | 2014193043 A  *  | 10/2014 |

* cited by examiner

ELECTRIC DRIVE VEHICLES

PRIORITY INFORMATION

This application claims priority to Japanese Patent Application No. 2014-137957, filed on Jul. 3, 2014, which is incorporated herein by reference in its entirety.

BACKGROUND

Technical Field

The present invention relates to an electric drive vehicle mounted with a voltage converter.

Related Art

In an electric drive vehicle such as a hybrid vehicle and an electric vehicle which uses a rotary electric machine as a driving source, DC power of a battery is converted into AC power by an inverter to drive the rotary electric machine. A buck-boost converter is further provided between the battery and the inverter to boost the battery voltage and step down the regenerative power from the rotary electric machine. As a converter with extended functions of such a buck-boost converter, for example, JP 2012-70514 discloses a voltage converter which is provided with four switching elements and connected to two batteries. With this voltage converter, boosting and stepping down of voltage become possible by turning the switching elements ON and OFF. It also becomes possible to switch between a series connection and a parallel connection of the two batteries by alternating the ON/OFF pattern of the switching elements.

In a series connection, because the output voltage is equal to the sum of the voltages of the two batteries, it is possible to lower the voltage boosting rate of each battery to a relatively low rate. Therefore, an advantage can be achieved that loss in the switching elements to be used for boosting the voltage is relatively low. However, in the series connection, it is disadvantageous that the output current is limited to that of the battery which has a lower tolerable electric current (maximum current) of the two batteries.

In a parallel connection, it is problematic that as the voltage boosting rate of each battery is higher than in the series connection, the loss in the switching elements is increased. However, as no current limit is applied, relatively large output of current becomes possible. In other words, with the same voltage, a larger electric power can be output with the parallel connection than with the series connection.

SUMMARY

When switching from a series connection to a parallel connection in response to a rapid increase of a load request (meaning, a high output request) is delayed, it is impossible to respond to the high output request during the delay period, and drivability is lowered. Thus, the present invention has an object to provide an electric drive vehicle which can supply electric power without delay in response to a change in a load request.

The present invention relates to an electric drive vehicle provided with a voltage converter which is capable of performing a bidirectional voltage conversion between two DC power supplies and a rotary electric machine, and a connection switch between a series connection and a parallel connection of the two power supplies with respect to the rotary electric machine, and a controller which controls the voltage conversion of the voltage converter and the connection switch of the power supplies. The controller sets the connection between the two power supplies to the parallel connection when an estimated value of an output electric current in accordance with a torque command to the rotary electric machine exceeds a tolerable electric current value of at least one of the two power supplies.

In another aspect, the present invention also relates to an electric drive vehicle provided with a voltage converter which is capable of performing a bidirectional voltage conversion between two DC power supplies and a rotary electric machine, and a connection switch between a series connection and a parallel connection of the two power supplies with respect to the rotary electric machine, and a controller which controls the voltage conversion of the voltage converter and the connection switch of the power supplies. The controller sets the connection between the two power supplies to the parallel connection when a changed amount between torque command values to the rotary electric machine exceeds a threshold.

In another aspect, the present invention also relates to an electric drive vehicle provided with a voltage converter which is capable of performing a bidirectional voltage conversion between two DC power supplies and a rotary electric machine, and a connection switch between a series connection and a parallel connection of the two power supplies with respect to the rotary electric machine, and a controller which controls the voltage conversion of the voltage converter and the connection switch of the power supplies. The controller sets the connection between the two power supplies to the parallel connection when a changed amount in rotation speed of the rotary electric machine exceeds a threshold.

In another aspect, the present invention also relates to an electric drive vehicle provided with a voltage converter which is capable of performing a bidirectional voltage conversion between two DC power supplies and a rotary electric machine, and a connection switch between a series connection and a parallel connection of the two power supplies with respect to the rotary electric machine, and a controller which controls the voltage conversion of the voltage converter and the connection switch of the power supplies. The controller sets the connection between the two power supplies to the parallel connection when drive wheels slip.

In another aspect, the present invention also relates to an electric drive vehicle provided with a voltage converter which is capable of performing a bidirectional voltage conversion between two DC power supplies and a rotary electric machine, and a connection switch between a series connection and a parallel connection of the two power supplies with respect to the rotary electric machine, and a controller which controls the voltage conversion of the voltage converter and the connection switch of the power supplies. The electric drive vehicle is mounted with an internal combustion engine as a drive source. The internal combustion engine is driven initially with an output torque from the rotary electric machine. The controller sets the connection between the two power supplies to the parallel connection in response to an output of a start command of the internal combustion engine.

In another aspect, the present invention also relates to an electric drive vehicle provided with a voltage converter which is capable of performing a bidirectional voltage conversion between two DC power supplies and a rotary electric machine, and a connection switch between a series connection and a parallel connection of the two power supplies with respect to the rotary electric machine, and a controller which controls the voltage conversion of the voltage converter and the connection switch of the power supplies. The controller sets the connection between the two power supplies to the parallel connection when a vehicle control, which is performed when drive wheels slip while being driven, is turned OFF.

In another aspect, the present invention also relates to an electric drive vehicle provided with a voltage converter which is capable of performing a bidirectional voltage conversion between two DC power supplies and a rotary electric machine, and a connection switch between a series connection and a parallel connection of the two power supplies with respect to the rotary electric machine, and a controller which controls the voltage conversion of the voltage converter and the connection switch of the power supplies. The controller sets the connection between the two power supplies to the parallel connection when a vehicle control, which is performed when drive wheels slip while being driven or braked, has a fault condition.

In the present invention, it is preferable that limit values are set in the controller to limit an electric power command value in accordance with a torque command to the rotary electric machine, that the limit value includes a first limit value and a second limit value which is set higher than the first limit value, and further that the controller switches the first limit value to the second limit value in response to the connection switch from the series connection to the parallel connection between the two power supplies.

According to the present invention, it becomes possible to supply electric power without delay in response to a change in a load request.

DETAILED DESCRIPTION

Figure 1:
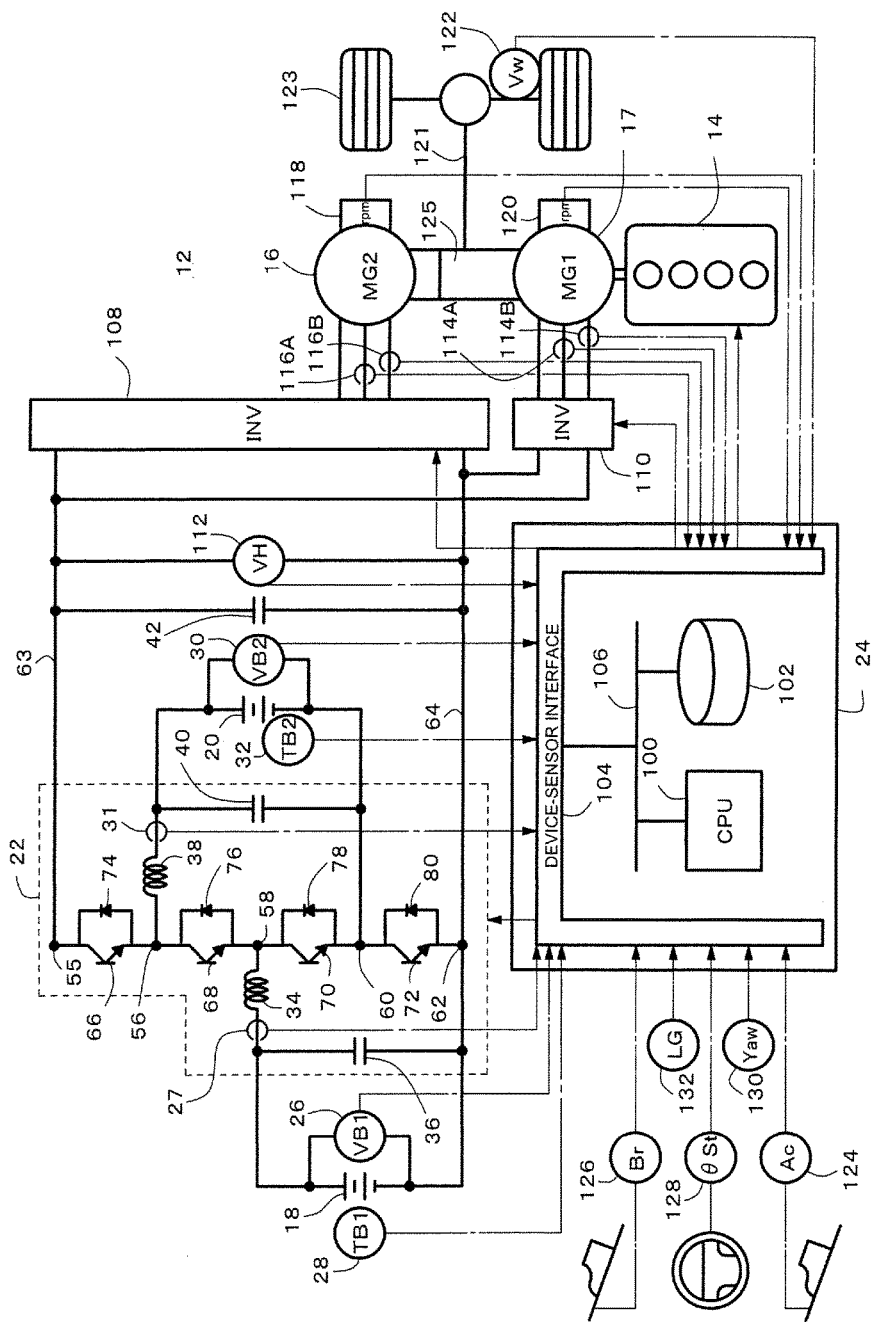
FIG. 1 is a block diagram of an electric drive vehicle according to an embodiment of the present invention.

Embodiments of the present invention are described below with reference to the attached drawings. FIG. 1 shows an exemplary electric drive vehicle 12 according to an embodiment of the present invention. It should be noted that the dash-dot lines in FIG. 1 represents signal lines.

<Configuration of Electric Drive Vehicle>

The electric drive vehicle 12 shown in FIG. 1 is a hybrid vehicle mounted with an internal combustion engine 14 and rotary electric machines 16 (MG2), 17 (MG1) as drive sources. In place of the hybrid vehicle, the electric drive vehicle 12 may be an electric vehicle which is driven by the rotary electric machines alone without the internal combustion engine.

As shown in FIG. 1, a first battery 18 and a second battery 20 are respectively connected to a voltage converter 22. The voltage converter 22 boosts DC voltages VB1, VB2 from the first battery 18 and the second battery 20 and outputs the boosted voltages to output paths 63, 64. The output paths 63, 64 are connected to inverters 108 and 110.

The inverters 108, 110 are respectively three-phase inverters. The first inverter 108 is connected to the rotary electric machine 16 (MG2) and the second inverter 110 is connected to the rotary electric machine 17 (MG1). A predetermined three-phase AC current is supplied to the rotary electric machines 16, 17 by controlling ON and OFF of the switching elements of the inverters 108, 110 such that the rotary electric machines 16, 17 are driven to be rotated.

The output shafts of the rotary electric machines 16, 17 are connected to a planetary gear type power distributer 125. The power distributer 125 is also connected to an output shaft of the internal combustion engine 14 and a drive shaft 121 which transmits power to drive wheels 123. The power distributer 125 performs various power transmissions. For example, the power distributer 125 distributes an output from the internal combustion engine 14 to the drive wheels 123 as a driving force and the rotary electric machine 17 (MG1) as a driving force for power generation. In addition to the output from the internal combustion engine 14, the power distributer 125 also distributes an output from the rotary electric machine 16 (MG2) to the drive shaft 121 as a driving force.

Regenerative braking is performed by the rotary electric machine 16 (MG2) during a braking operation of the electric drive vehicle 12. The regenerated power is converted from AC power to DC power by the inverter 108, stepped down by the voltage converter 22, and then supplied to the first battery 18 and the second battery 20.

The electric drive vehicle 12 is provided with a controller 24. The controller 24 controls the boosted and stepped down voltage (voltage conversion) and switching between a series connection and a parallel connection (switching of power supply connection) by controlling ON and OFF of the switching elements 66, 68, 70, 72 of the voltage converter 22. The controller 24 also controls switching between the DC to AC conversion and the AC to DC conversion by controlling ON and OFF of the switching elements (not shown) of the inverters 108, 110. Further, the controller 24 controls the driving of the rotary electric machines 16, 17 via the control of the voltage converter 22 and the inverters 108, 110.

<Details of Each Element>

The first battery 18 and the second battery 20 are DC power supplies including a rechargeable battery, such as a lithium-ion rechargeable battery and a nickel-metal hydride rechargeable battery. In place of the rechargeable battery, at least one of the first battery 18 and the second battery 20 may be an energy storage element such as an electric double layer capacitor.

By turning the switching elements 66, 68, 70, and 72 ON and OFF, the voltage converter 22 performs bidirectional voltage conversion between the batteries (the first battery 18 and the second battery 20) and the rotary electric machines 16, 17, and also switches between a series connection and a parallel connection of the first battery 18 and the second battery 20 connected to the rotary electric machines 16, 17.

The output path of the voltage converter 22 includes a reference path 64 connected to the negative side of the first battery 18 and the second battery 20 and a high voltage path 63 through which a high voltage boosted by the voltage converter 22 is outputted. A smoothing capacitor 42 is provided between the reference path 64 and the high voltage path 63.

The voltage converter 22 is provided with a first reactor 34 connected in series to the first battery 18 and a first capacitor 36 connected in parallel to the first battery 18. The voltage converter 22 is also provided with a second reactor 38 connected in series to the second battery 20 and a second capacitor 40 connected in parallel to the second battery 20.

The switching elements 66, 68, 70, 72 of the voltage converter 22 are transistor elements such as an IGBT. The switching elements 66, 68, 70, 72 are connected in series with each other such that the direction from the high voltage path 63 to the reference path 64 becomes a forward direction. Diodes 74, 76, 78, 80 are respectively connected in anti-parallel to the switching elements 66, 68, 70, 72.

The first battery 18 is connected to a node 58 between the switching element 68 which is the second switching element from the high voltage path 63 and the third switching element 70, and to the reference path 64. The second battery 20 is connected to a node 56 between the switching element 66 which is the first switching element from the high voltage path 63 and the second switching element 68, and to a node 60 between the third switching element 70 and the fourth switching element 72.

As described further below, the controller 24 performs various operation controls of the electric drive vehicle 12, including switching of a power supply to the voltage converter 22. The controller 24 may be a computer in which a CPU 100, a storage unit 102, and a device-sensor interface 104 are connected to each other via an internal bus 106.

The controller 24 receives signals from various sensors via the device-sensor interface 104. Specifically, the controller 24 receives detection signals from a first battery voltage sensor 26 which senses the voltage VB1 of the first battery 18, a first battery current sensor 27 which senses the current IB1 of the first battery 18, and a first battery temperature sensor 28 which senses the temperature TB1 of the first battery 18. The controller 24 also receives detection signals from a second battery voltage sensor 30 which senses the voltage VB2 of the second battery 20, a second battery current sensor 31 which senses the current IB2 of the second battery 20, and a second battery temperature sensor 32 which senses the temperature TB2 of the second battery 20. The controller 24 further receives signals indicating the output voltage VH of the output paths 63, 64 from an output voltage sensor 112.

Further, from current sensors 114A, 114B, 116A, 116B via the device-sensor interface 104, the controller 24 receives detection signals indicating the actual rotation speed and three-phase AC current values of the rotary electric machines 16, 17 from resolvers 118, 120 which are rotation speed sensors.

Via the device-sensor interface 104, the controller 24 receives various detection signals from a wheel speed sensor 122 which senses the rotation speed of the drive wheels 123, an accelerator pedal depression amount sensor 124, a brake pedal depression amount sensor 126, a steering sensor 128, a yaw rate sensor 130, and an acceleration speed sensor 132.

Via the device-sensor interface 104, the controller 24 also supplies control signals to the switching elements 66, 68, 70, 72 of the voltage converter 22 and the switching elements of the inverters 108, 110. The CPU 100 of the controller 24 performs ON/OFF control of the switching elements 66, 68, 70, 72 of the voltage converter 22 and the switching elements of the inverters 108, 110 by executing various control programs stored in the storage unit 102 to process the detection signals received from the respective sensors. The controller 24 controls the drive of the rotary electric machines 16, 17 by performing ON/OFF control of the switching elements of the voltage converter 22 and the inverters 108, 110. Further, the controller 24 is connected to the internal combustion engine 14 via the device-sensor interface 104 to control the drive of the internal combustion engine 14 by the CPU 100.

<Operations of Voltage Converter>

Switching between a series connection and a parallel connection by the voltage converter 22 is described by referring to FIGS. 2 to 10. It should be noted that although the connection patterns switchable by the voltage converter 22 are not limited to the connection patterns shown in these drawings and various other patterns are also possible, the description below focuses on the connection patterns assumed in the present embodiment. Specifically, in the switch control according to the present embodiment, switching from the connection state described in <(1) series connection for boosting and stepping down voltage> or <(2) direct series connection> described below to the connection state described in <(3) parallel connection for boosting and stepping down voltage> is mainly referred to. These three connection states are described below.

In FIGS. 2 to 10, the switching elements 66, 68, 70, 72 are illustrated with switch symbols indicating the electric current forward direction in order to facilitate understanding. Each element of the voltage converter 22 is described with the following reference letters and numerals: "B1" representing the first battery 18, "L1" the first reactor 34, "C1" the first capacitor 36, "B2" the second battery 20, "L2" the second reactor 38, "C2" the second capacitor 40, "CH" the smoothing capacitor 42, "S1", "S2", "S3", "S4" the switching elements 66, 68, 70, 72 in this order, and "D1", "D2", "D3", "D4" the diodes 74, 76, 78, 80 in this order. The rotary electric machines 16, 17 to which the electric power is supplied are simply represented by load "LD". In order to simplify the drawings, the inverters 108, 110 are not shown.

<(1) Series Connection for Boosting and Stepping Down Voltage>

Figure 2:
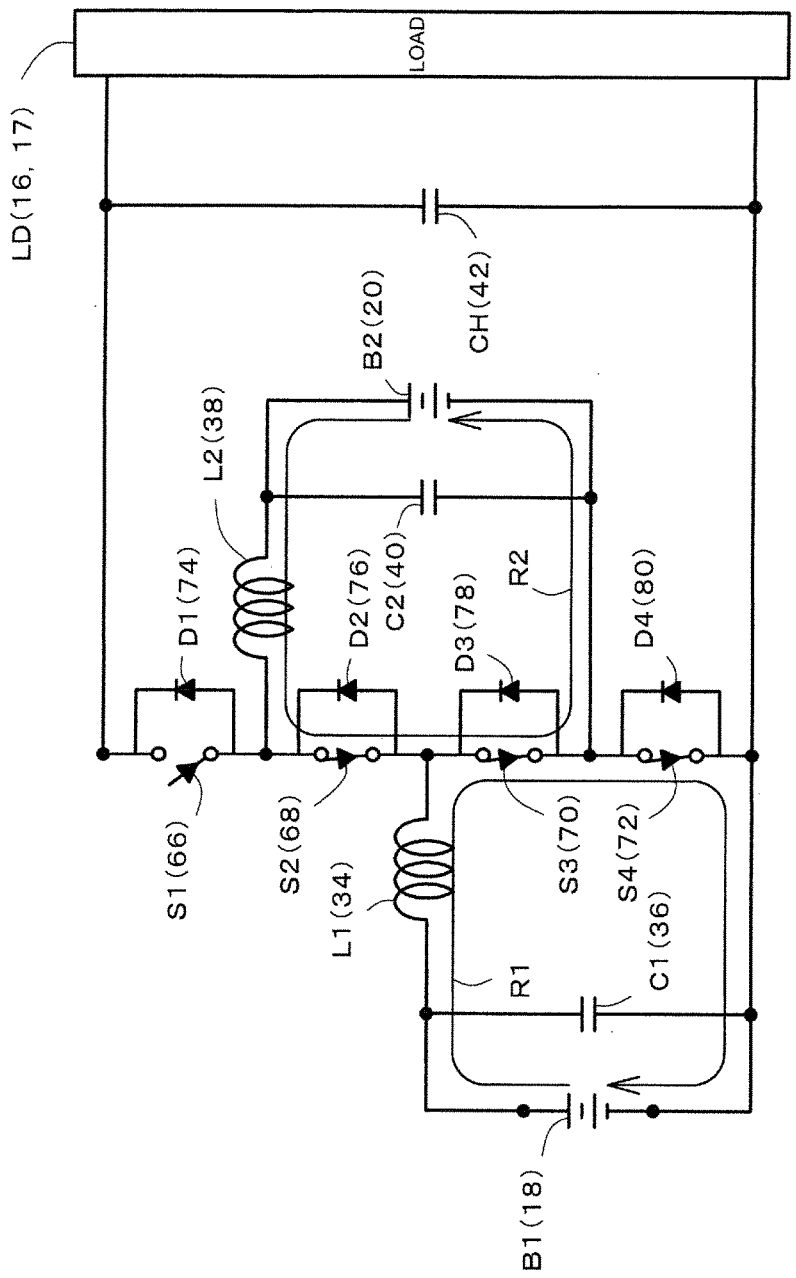
FIG. 2 is a schematic diagram for describing an operation (charging while driving a motor in a series connection for boosting the voltage) of a voltage converter according to an embodiment of the present invention.

FIGS. 2 to 5 show exemplary boosting and stepping down voltage operations with B1 (18) and B2 (20) connected in series. In this connection state, the switching element S3 (70) is fixed to ON, while S1 (66), S2 (68), and S4 (72) are turned ON and OFF. Among boosting voltage operations, FIG. 2 shows an exemplary charging process while driving a motor. In the charging process, S1 (66) is turned OFF, S2 (68) is turned ON, (S3 (70) is fixed to ON), and S4 (72) is turned ON. In this state, a circuit R1 is formed in which an electric current flows in the order of B1 (18)→L1 (34)→S3 (70)→S4 (72)→B1 (18). A circuit R2 in which an electric current flows in the order of B2 (20)→L2 (38)→S2 (68)→S3 (70)→B2 (20) is also formed. Electric energy (electromagnetic energy) is charged in L1 (34) by the formed circuit R1). Similarly, electric energy is charged in L2 (38) by the formed circuit R2.

Figure 3:
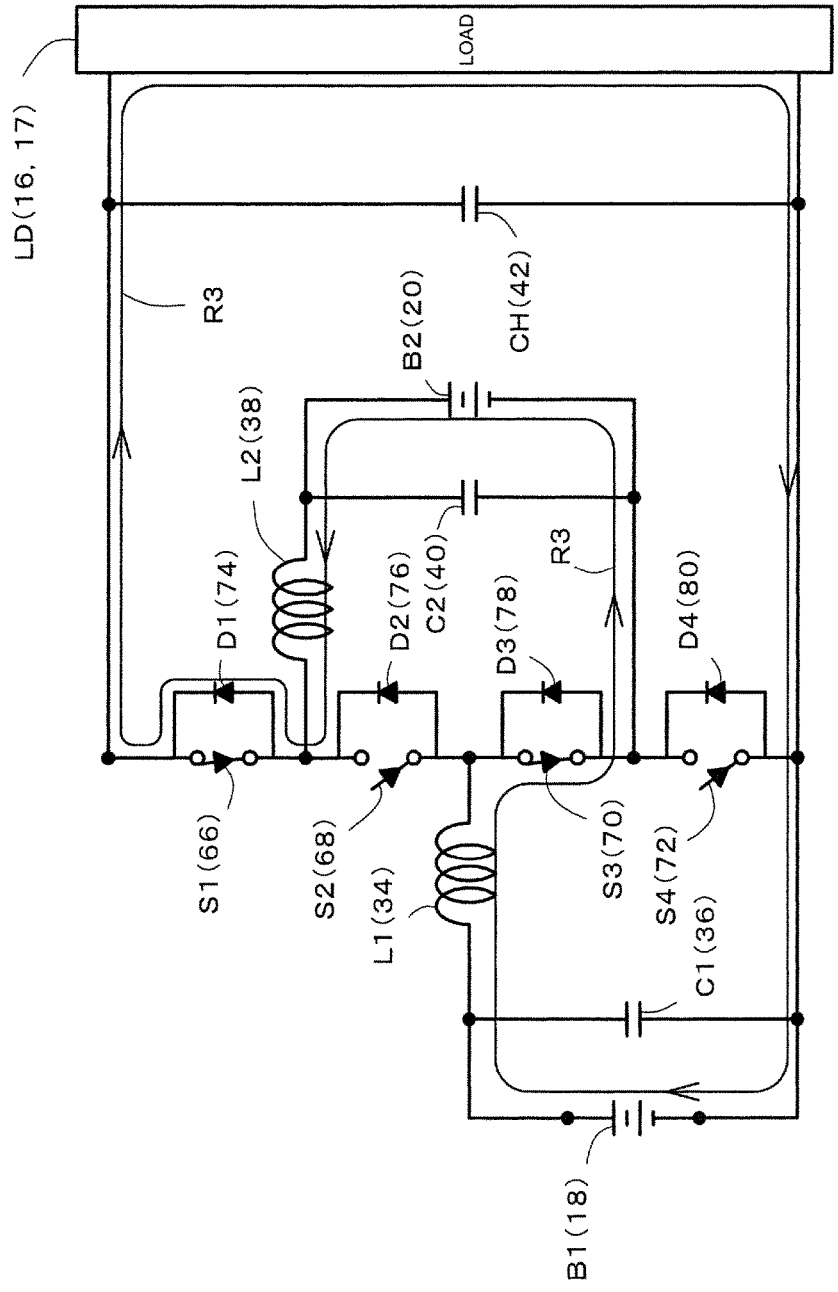
FIG. 3 is a schematic diagram for describing an operation (discharging while driving a motor in a series connection for boosting voltage) of a voltage converter according to an embodiment of the present invention.

Among boosting voltage operations, FIG. 3 shows a discharging process while driving a motor after the charging process. In this process, S1 (66) is turned ON, S2 (68) is turned OFF, (S3 (70) is fixed to ON), and S4 (72) is turned OFF. In this state, a circuit R3 is formed in which an electric current flows in the order of B1 (18)→L1 (34)→S3 (70) →B2 (20)→L2 (38)→D1 (74)→LD (16, 17)→B1 (18). Electric energy charged in L1 (34) and L2 (38) is discharged and added to the output voltage of the batteries B1, B2 (boosting voltage operation) by the formed circuit R3.

Figure 4:
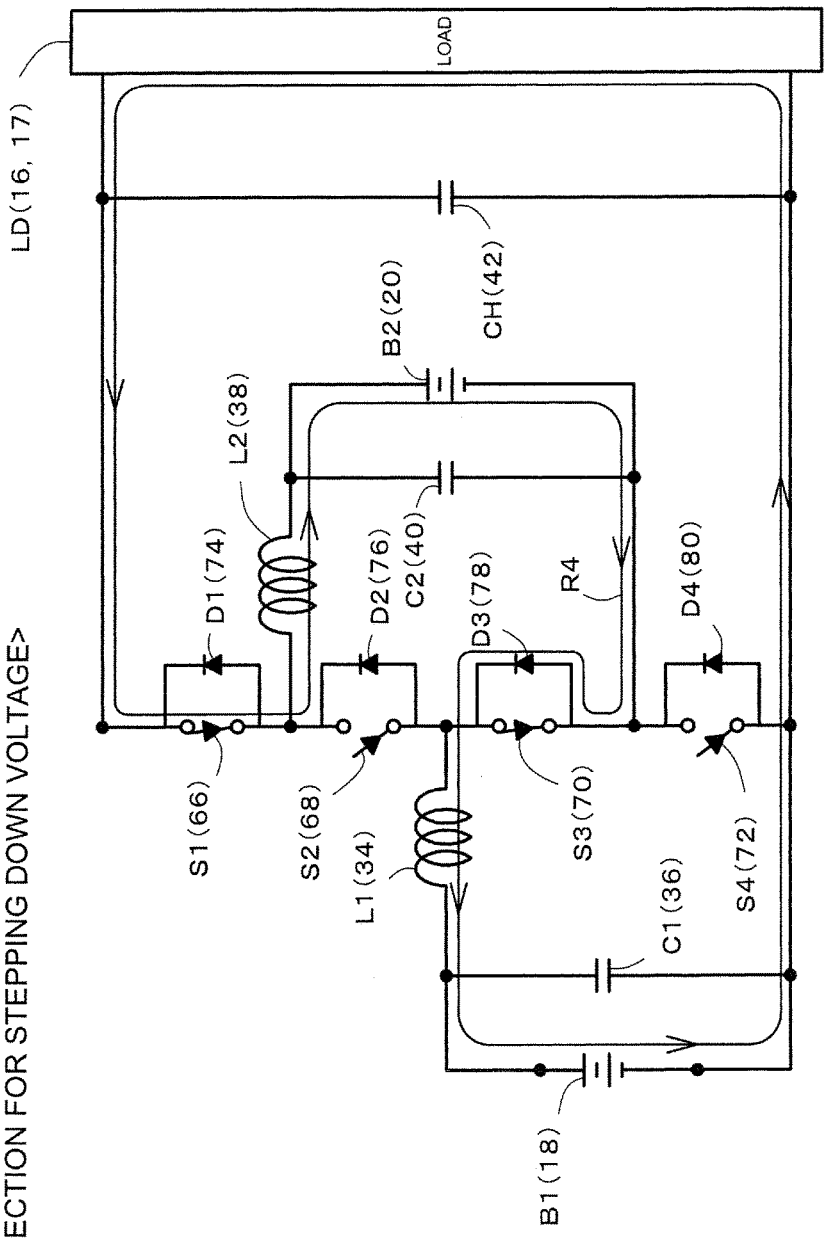
FIG. 4 is a schematic diagram for describing an operation (charging while regenerating power in a series connection for stepping down voltage) of a voltage converter according to an embodiment of the present invention.

Among stepping down voltage operations, FIG. 4 shows a charging process while regenerating power. The ON and OFF states of the switching elements are identical to those in the discharging process while driving a motor shown in FIG. 3. In this state, a circuit R4 is formed in which an electric current flows in the order of LD (16, 17)→S1 (66)→L2 (38)→B2 (20)→D3 (78)→L1 (34)→B1 (18) →LD (16, 17). Regenerated power is supplied to B1 (18) and B2 (20) by the formed circuit R4, and electric energy is also charged in L1 (34) and L2 (38).

Figure 5:
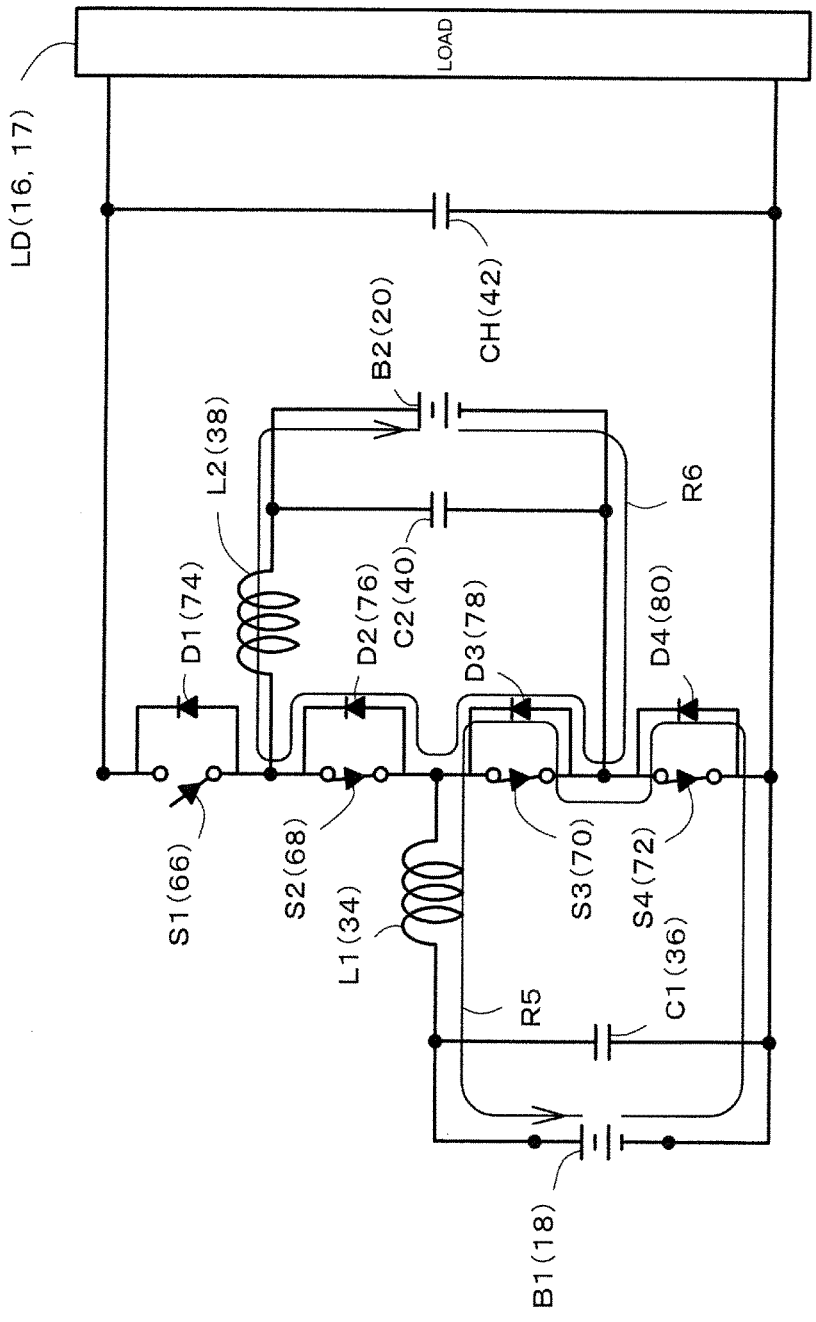
FIG. 5 is a schematic diagram for describing an operation (discharging while regenerating power in a series connection and a parallel connection for stepping down voltage) of a voltage converter according to an embodiment of the present invention.

Among stepping down voltage operations, FIG. 5 shows a discharging process while regenerating power after the charging process. The ON and OFF states of the switching elements are identical to those in the charging process while driving a motor shown in FIG. 2. In this state, a circuit R5 is formed in which an electric current flows in the order of L1 (34)→B1 (18)→D4 (80)→D3 (78)→L1 (34). A circuit R6 in which an electric current flows in the order of L2 (38)→B2 (20)→D3 (78)→D2 (76)→L2 (38) is also formed. With the formed circuits R5 and R6, while the connection between the regeneration side (LD 16, 17) and B1 (18), B2 (20) is disconnected, the electric energy charged in L1 (34) is discharged to B1 (18) and the electric energy charged in L2 (38) is discharged to B2 (20).

<(2) Direct Series Connection>

Figure 6:
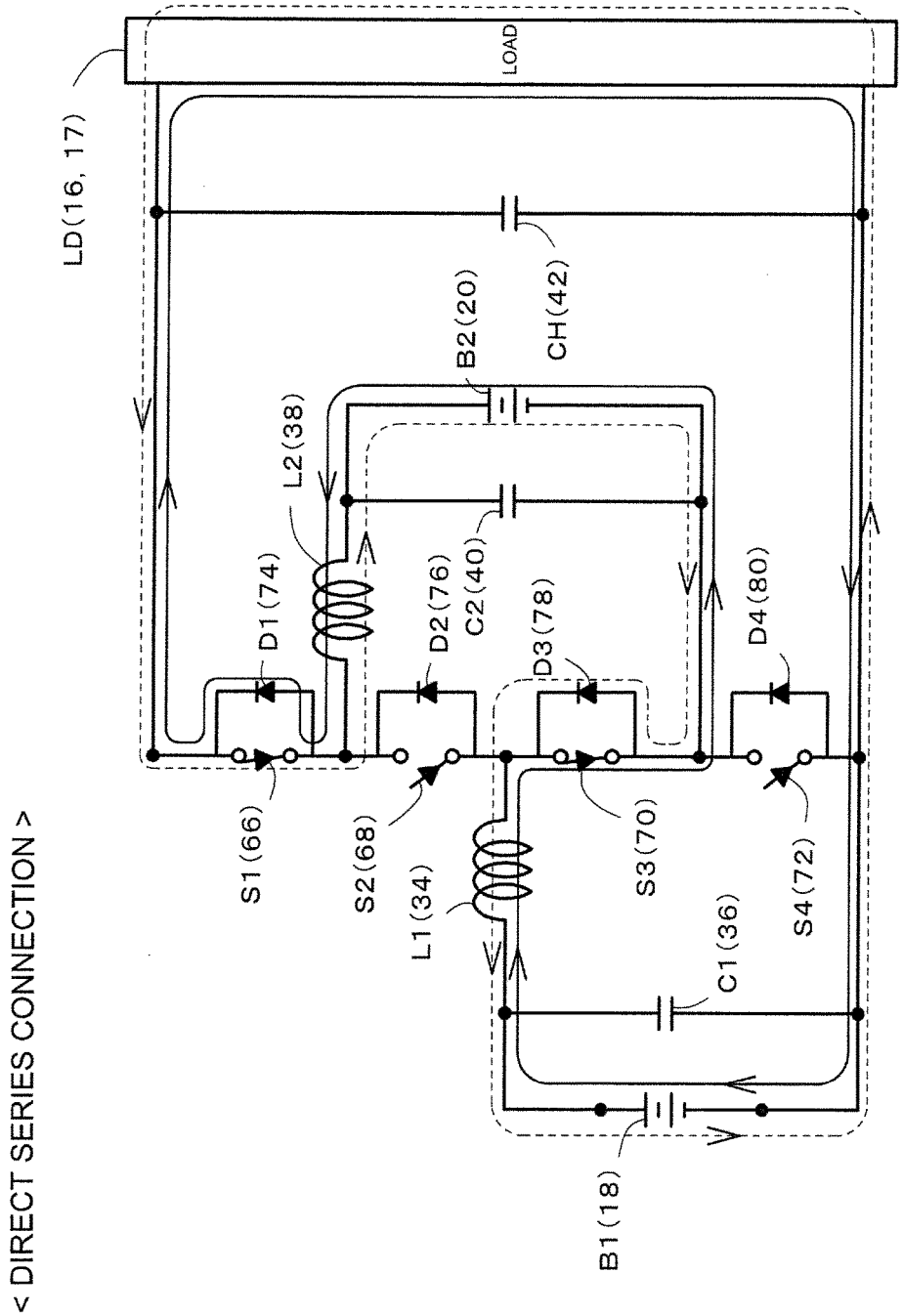
FIG. 6 is a schematic diagram for describing an operation (a direct series connection) of a voltage converter according to an embodiment of the present invention.

FIG. 6 shows a connection state in which B1 (18) and B2 (20) are connected in series and electric power is transmitted directly between B1 (18), B2 (20) and LD (16, 17) without performing the boosting and stepping down voltage operations. This connection state is equivalent to the one shown in <(1) series connection for boosting and stepping down voltage> without the boosting and stepping down voltage operations. In other words, the connection state while driving a motor (shown in the solid line) is identical to the one in FIG. 3 and the connection state while regenerating power (shown in the broken line) is identical to the one in FIG. 4. Regarding the switching elements, S1 (66) is fixed to ON, S2 (68) is fixed to OFF, S3 (70) is fixed to ON, and S4 (72) is fixed to OFF.

Both of the above described (1) series connection for boosting and stepping down voltage and (2) direct series connection described above can achieve advantages of a series connection. Specifically, the output voltage of the voltage converter 22 becomes the sum of the output voltages of the first battery 18 (B1) and the second battery 20 (B2). Therefore, even when the output voltage of each battery is lowered, such as when the states of charge (SOC) of the first battery 18 and the second battery 20 are lowered, a high output can be obtained for the whole power supply. In other words, both of (1) the series connection for boosting and stepping down voltage and (2) the direct series connection are advantageous in that, in contrast to a parallel connection, charged energy of the first battery 18 and the second battery 20 can be completely used.

Further, because the output voltages of the first battery 18 (B1) and the second battery 20 (B2) are summed, the voltage boosting rate of each battery is lower than in a parallel connection. As a result, an advantage can be achieved that the loss due to the switching elements 66, 68, 70, 72 can be reduced.

<(3) Parallel Connection for Boosting and Stepping Down Voltage>

Figure 7:
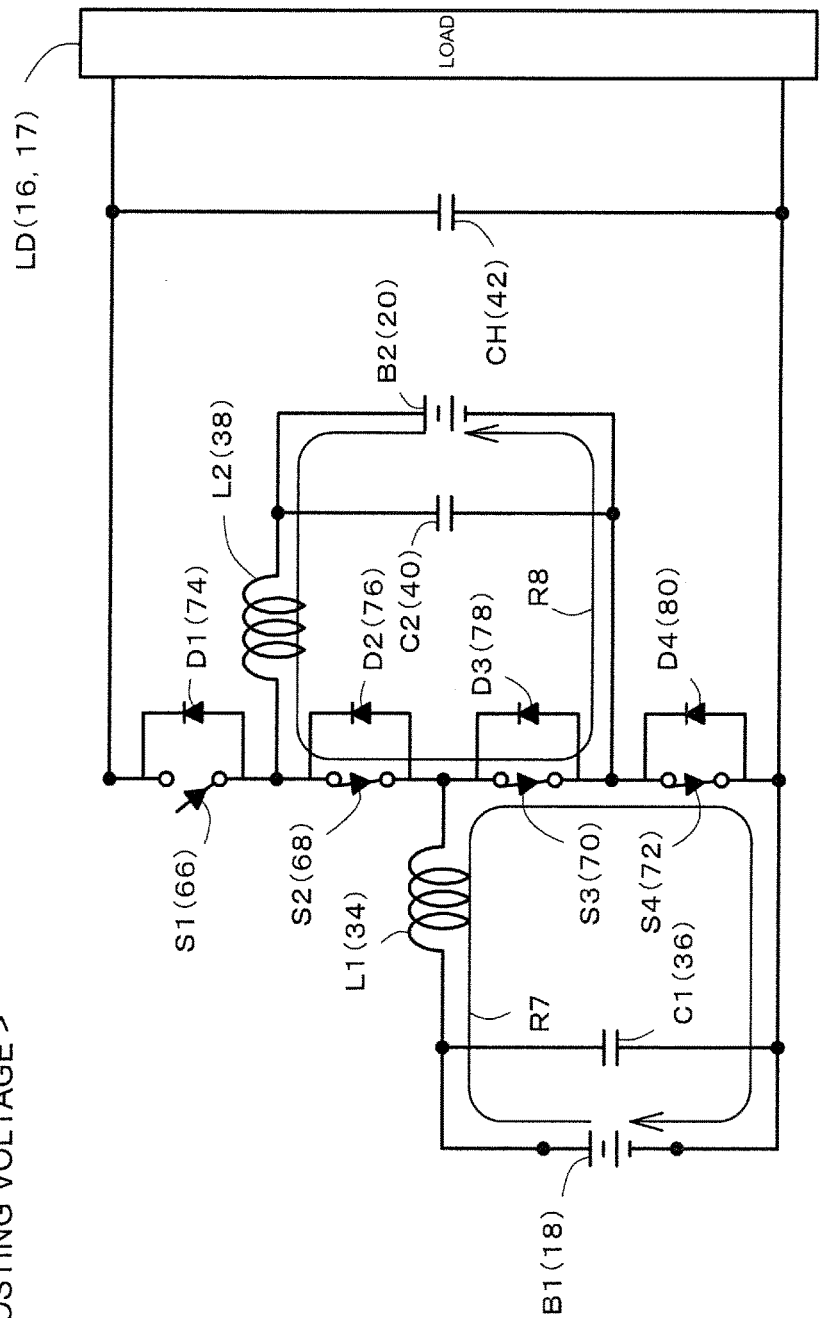
FIG. 7 is a schematic diagram for describing an operation (charging while driving a motor in a parallel connection for boosting voltage) of a voltage converter according to an embodiment of the present invention.
Figure 8:
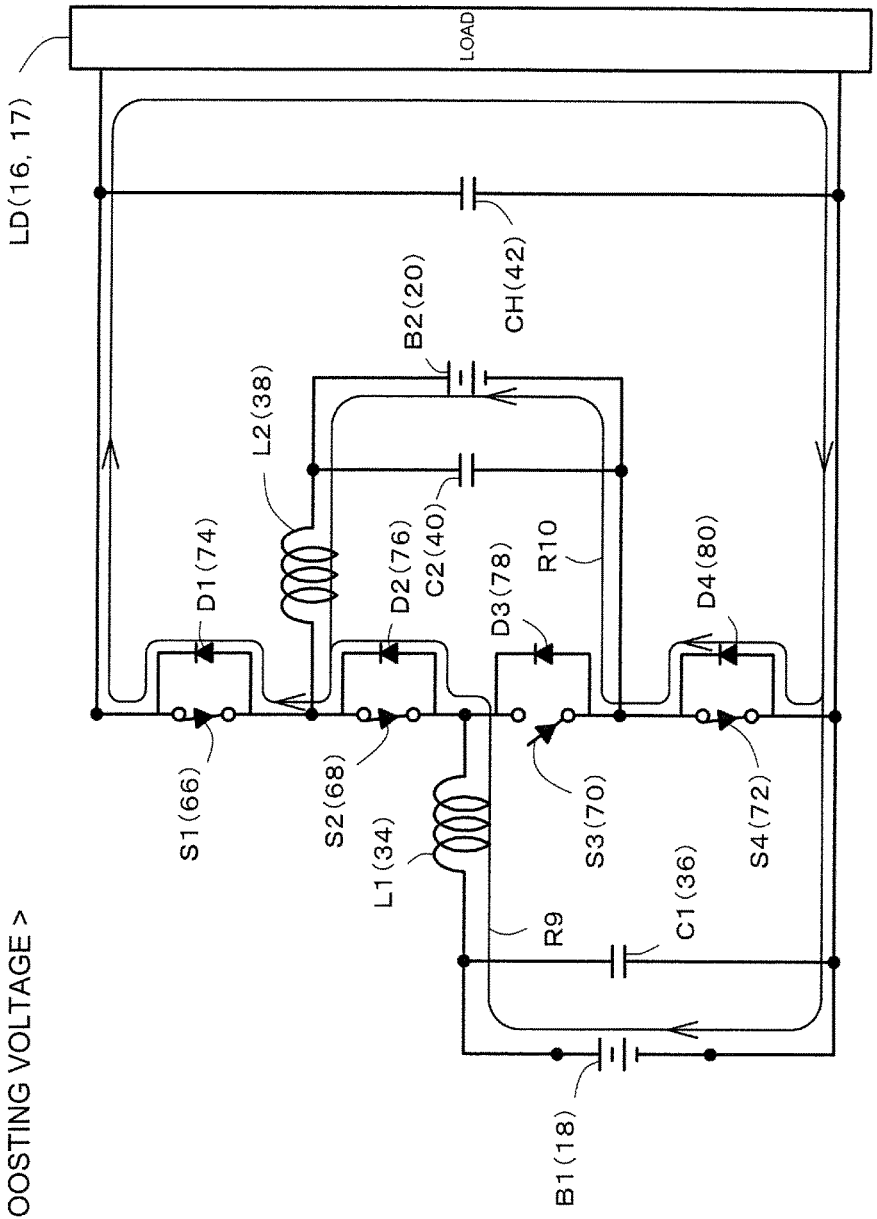
FIG. 8 is a schematic diagram for describing an operation (discharging while driving a motor in a parallel connection for boosting voltage) of a voltage converter according to an embodiment of the present invention.

FIGS. 7 to 10 show exemplary boosting and stepping down voltage operations with B1 (18) and B2 (20) connected in parallel. In this connection state, all of S1 (66), S2 (68), S3 (70), and S4 (72) are turned ON and OFF. Among boosting voltage operations, FIG. 7 shows a charging process while driving a motor. In this charging process, S1 (66) is turned OFF, and S2 (68), S3 (70), and S4 (72) are turned ON. In this state, a circuit R7 is formed in which an electric current flows in the order of B1 (18)→L1 (34)→S3 (70)→S4 (72)→B1 (18). A circuit R8 in which an electric current flows in the order of B2 (20)→L2 (38)→S2 (68)→S3 (70)→B2 (20) is also formed. With the formed circuit R7, electric energy is charged to L1 (34). Similarly, with the formed circuit R8, electric energy is charged to L2 (38). Among boosting voltage operations, FIG. 8 shows a discharging process after the charging process. In this discharging process, S1 (66) is turned ON, S2 (68) is turned ON, S3 (70) is turned OFF, S4 (72) is turned ON. In this state, a circuit R9 is formed in which an electric current flows in the order of B1 (18)→L1 (34)→D2 (76)→D1 (74)→LD (16, 17)→B1 (18). A circuit R10 in which an electric current flows in the order of B2 (20)→L2 (38)→D1 (74)→LD (16, 17)→D4 (80)→B2 (20) is also formed. With the formed circuits R9 and R10, the electric energy charged to L1 (34) and L2 (38) is discharged and added to the output voltage of B1 (18) and B2 (20) (boosting voltage operation).

Figure 9:
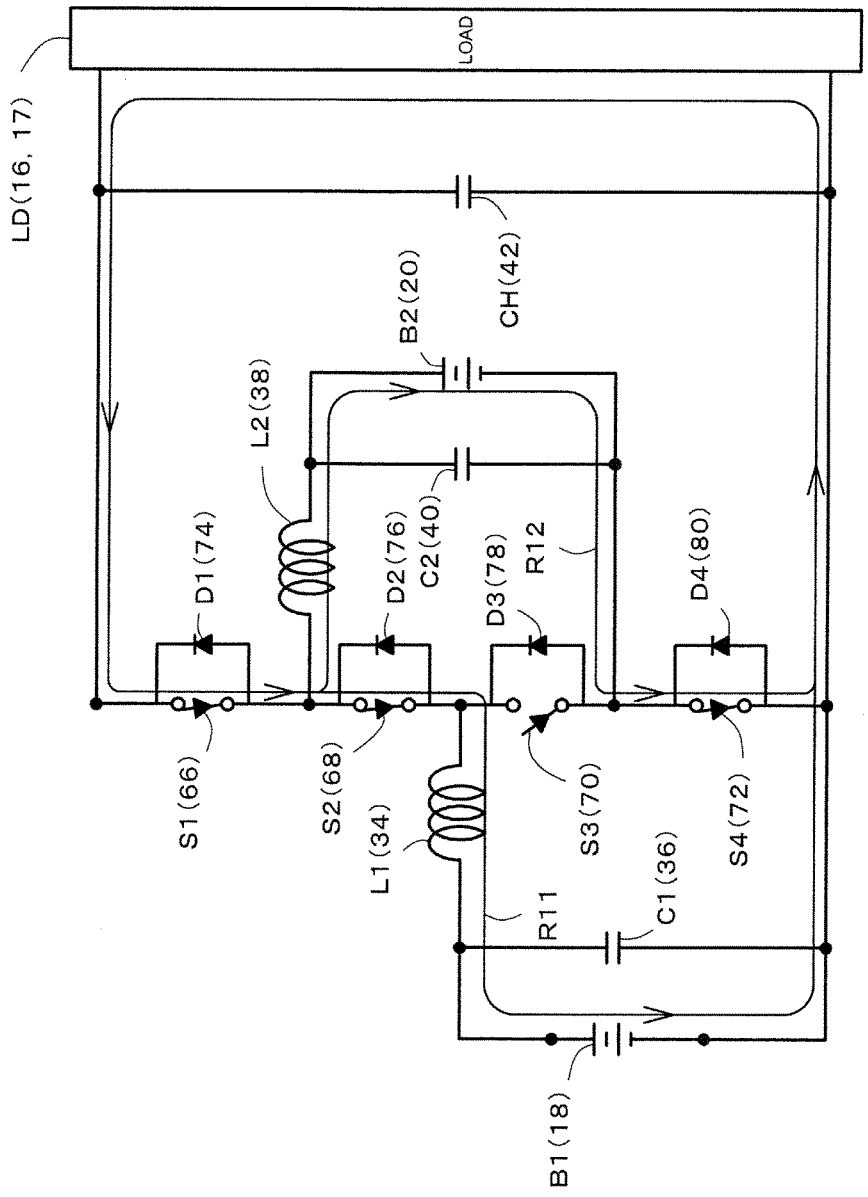
FIG. 9 is a schematic diagram for describing an operation (charging while regenerating power in a parallel connection for stepping down voltage) of a voltage converter according to an embodiment of the present invention.

Among stepping down voltage operations, FIG. 9 shows a charging process while regenerating power. The ON and OFF states of the switching elements are identical to those in the discharging process while driving a motor shown in FIG. 8. In this state, a circuit R11 is formed in which an electric current flows in the order of LD (16, 17)→S1 (66)→S2 (68)→L1 (34)→B1 (18)→LD (16, 17). A circuit R12 in which an electric current flows in the order of LD (16, 17)→S1 (66)→L2 (38)→B2 (20)→S4 (72)→LD (16, 17) is also formed. With the formed circuits 11 and 12, regenerated power is supplied to B1 (18) and B2 (20) and electric energy is also charged in L1 (34) and L2 (38).

Figure 10:
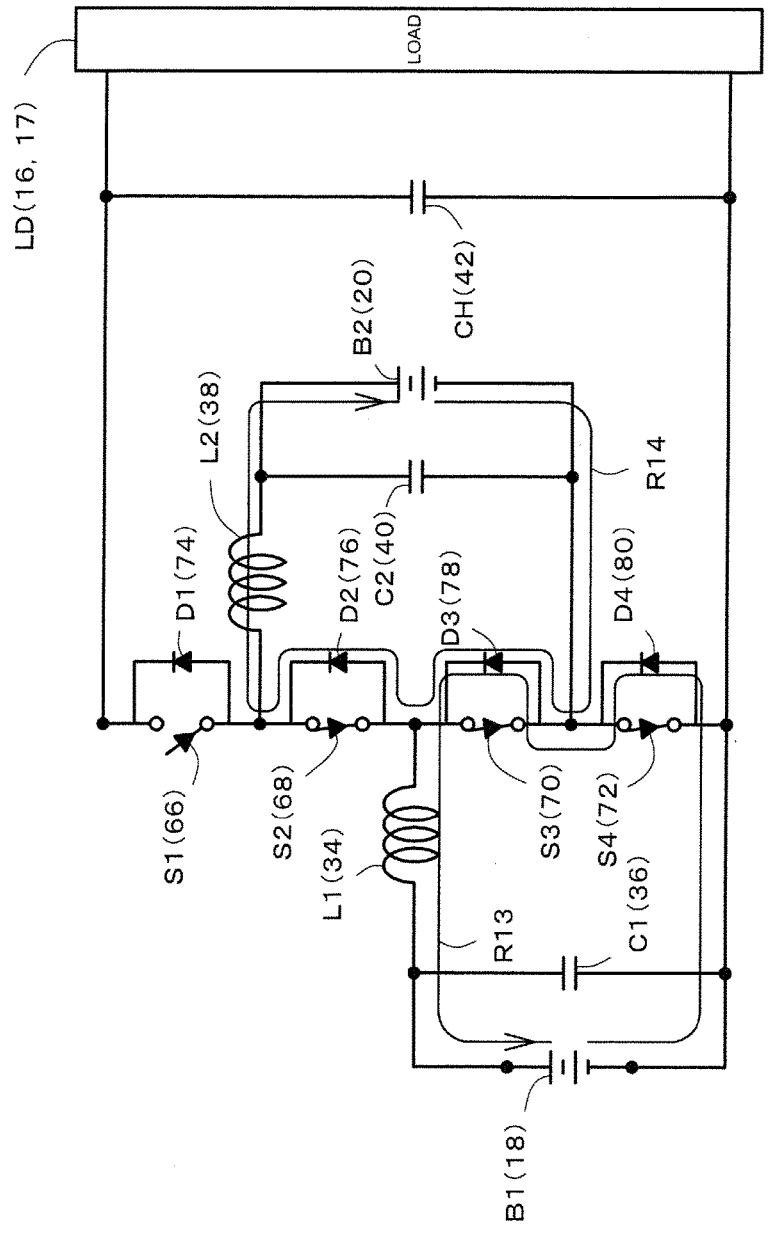
FIG. 10 is a schematic diagram for describing an operation (discharging while regenerating power in a parallel connection for stepping down voltage) of a voltage converter according to an embodiment of the present invention.

Among stepping down voltage operations, FIG. 10 shows a discharging process while driving a motor after the charging process. The ON and OFF states of the switching elements are identical to those in the charging process while driving a motor shown in FIG. 7. In this state, a circuit R13 is formed in which an electric current flows in the order of L1 (34)→B1 (18)→D4 (80)→D3 (78)→L1 (34). A circuit R14 in which an electric current flows in the order of L2 (38)→B2 (20)→D3 (78)→D2 (76)→L2 (38) is also formed. With the formed circuit R13, the electric energy charged in L1 (34) is discharged to B1 (18). Similarly, with the formed circuit R14, the electric energy charged in L2 (38) is discharged to B2 (20).

The above described (3) parallel connection for boosting and stepping down voltage can achieve advantages of a parallel connection. Specifically, while the maximum current of the whole power supply is limited to that of the battery having the lower tolerable electric current (maximum current) in a series connection, such a limitation does not apply to a parallel connection. Therefore, a higher electric current output becomes possible in (3) the parallel connection for boosting and stepping down voltage than (1) the series connection for boosting and stepping down voltage and (2) the direct series connection. Therefore, when the output voltage of all (1) the series connection for boosting and stepping down voltage, (2) the direct series connection, and (3) the parallel connection for boosting and stepping down voltage are the same, the largest electric power can be supplied by (3) the parallel connection for boosting and stepping down voltage. In this way, in response to a high output request which cannot be handled by either one of (1) the series connection for boosting and stepping down voltage and (2) the direct series connection, (3) the parallel connection for boosting and stepping down voltage can cope.

Further, in (3) the parallel connection for boosting and stepping down voltage, electric current paths of the first battery 18 and the second battery 20 are independent. Therefore, it becomes possible to distribute electric current in accordance with the respective SOCs of the first battery 18 and the second battery 20.

<First Embodiment of Connection Switch Control by Controller>

Figure 11:
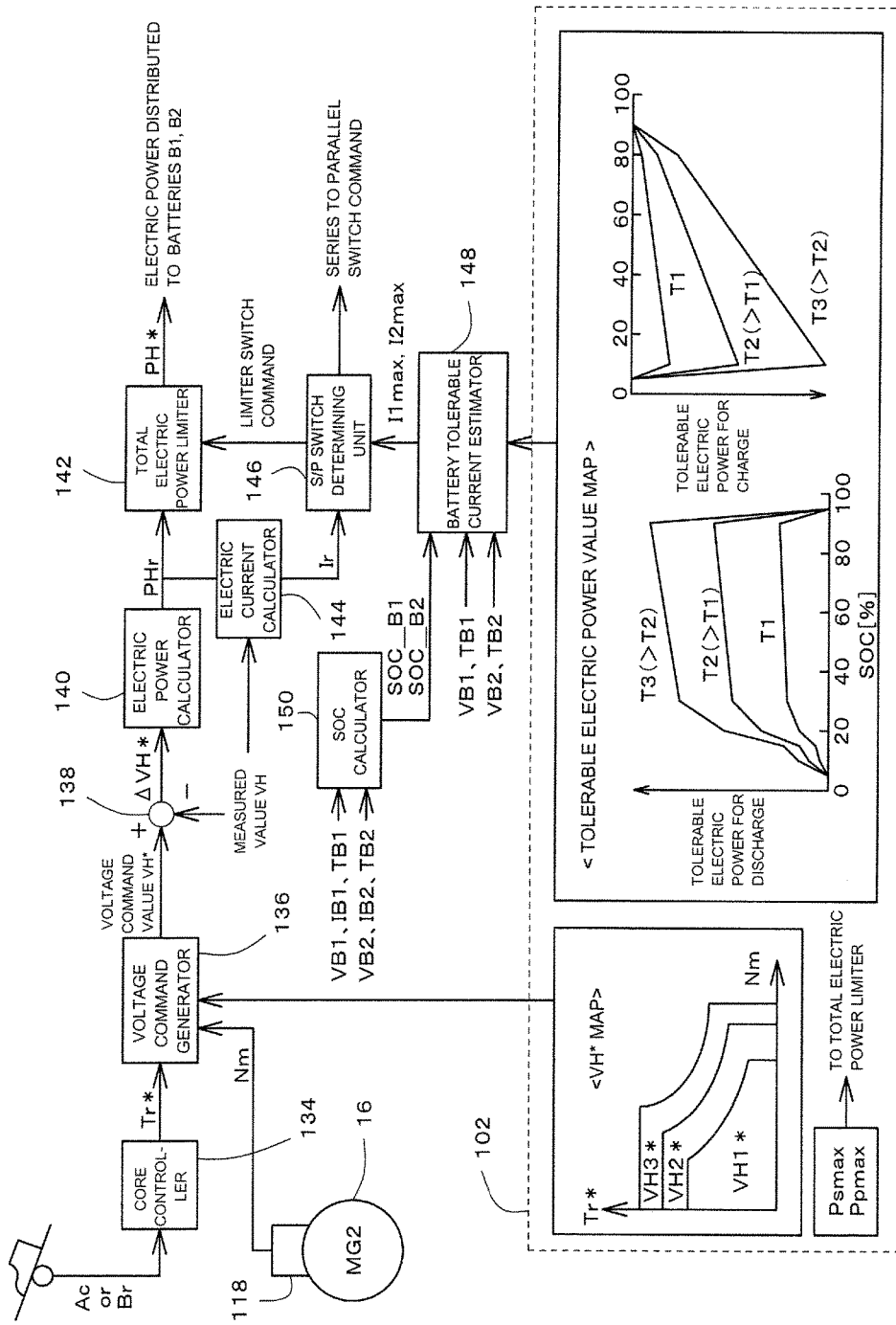
FIG. 11 is a control block diagram for describing a switch control from a series connection to a parallel connection of an electric drive vehicle according to a first embodiment.

FIG. 11 shows an exemplary control block diagram of connection switch control of the first battery 18 and the second battery 20 by the controller 24. The controller 24 switches the connection between the two batteries 18, 20 to a parallel connection when an estimated output current based on a torque command to the rotary electric machines 16, 17 exceeds the tolerable electric current of either one of the two batteries 18, 20.

The exemplary control block diagram shown in FIG. 11 shows a control flow when the CPU 100 of the controller 24 performs a switch control program stored in the storage unit 102. Further, in order to facilitate understanding of the control processes, execution of each process of the program by the controller 24 is shown as an independent function unit (function block).

Although the rotary electric machine 16 (MG2) alone is shown as a load in the description of the control below including FIG. 11 in order to facilitate understanding, embodiments of the present invention are not limited to this example. In other words, any electric devices which request a large electric current to the first battery 18 and the second battery 20 can be controlled in embodiments of the present invention. In an embodiment, an actual rotation speed or a torque command value of the rotary electric machine 17 (MG1) may be obtained.

A configuration of the control block diagram according to FIG. 11 is described. A core controller 134 outputs a torque command value Tr* in response to inputs of an accelerator pedal depression amount Ac sensed by the accelerator pedal depression amount sensor 124 or a brake pedal depression amount Br sensed by the brake pedal depression amount sensor 126. A voltage command generator 136 outputs a voltage command value VH* in response to the input of the torque command value Tr* and the actual rotation speed Nm from the resolver 118.

A deviation calculator 138 outputs a voltage deviation ΔVH in response to the input of the voltage command value VH* and a voltage measured value VH of the output paths 63, 64 from the output voltage sensor 112. An electric power calculator 140 outputs a total electric power PHr in response to the input of the voltage deviation ΔVH. The electric current calculator 144 outputs an electric current estimated value Ir which is an estimated value of an output current, in response to the input of the total electric power PHr and the output voltage VH of the output paths 63, 64 from the output voltage sensor 112.

A SOC calculator 150 receives inputs of the voltage value VB1 of the first battery 18 from the first battery voltage sensor 26, the temperature TB1 of the first battery 18 from the first battery temperature sensor 28, and the electric current value IB1 from the first battery current sensor 27. The SOC calculator 150 also receives inputs of the voltage value VB2 of the second battery 20 from the second battery voltage sensor 30, the temperature TB2 of the second battery 20 from the second battery temperature sensor 32, and the electric current value IB2 of the second battery 20 from the second battery current sensor 31. In response to these inputs, the SOC calculator 150 outputs the state of charge (SOC) value SOC_B1 of the first battery 18 and the SOC value SOC_B2 of the second battery 20.

A battery tolerable electric current estimator 148 receives inputs of the voltage value VB1 of the first battery 18 from the first battery voltage sensor 26, the temperature TB1 of the first battery 18 from the first battery temperature sensor 28, and the SOC value SOC_B1 of the first battery 18 from the SOC calculator 150. The battery tolerable electric current estimator 148 also receives inputs of the voltage value VB2 of the second battery 20 from the second battery voltage sensor 30, the temperature TB2 of the second battery 20 from the second battery temperature sensor 32, and the SOC value SOC_B2 of the second battery 20 from the SOC calculator 150. In response to these inputs, the battery tolerable electric current estimator 148 outputs the tolerable electric current values (maximum electric current values) I1max and I2max of the first battery 18 and the second battery 20.

A series/parallel (S/P) switch determining unit 146 outputs a switch command to switch a serious connection between the first battery 18 and the second battery 20 to a parallel connection in response to inputs of electric current estimated value Ir and tolerable electric current values I1max and I2max. The series/parallel switch determining unit 146 also outputs a limiter switch command to a total electric power limiter 142. The total electric power limiter 142 outputs a total electric power command PH* in response to inputs of the total electric power PHr and the limiter switch command.

Next, each element in the control block is described. The core controller 134 processes each information input from the device-sensor interface 104 to output a command regarding vehicle operations. Description will focus only on the switching functions according to embodiments of the present invention, and the core controller 134 generates the torque command value Tr* while driving a motor to the rotary electric machine 16 in accordance with the accelerator pedal depression amount Ac. The core controller 134 also generates the torque command value Tr* (while regenerating power) to the rotary electric machine 16 in accordance with the brake pedal depression amount Br. The torque command value Tr* may be obtained, for example, by calling a torque command value map in which the correspondence between the torque command value Tr* and pedal depression amounts Ac, Br of the respective pedals.

The core controller 134 further starts the internal combustion engine 14 when the accelerator pedal depression amount is large or the SOCs of the first battery 18 and the second battery 20 are lowered. In order to start the internal combustion engine 14, the internal combustion engine 14 is cranked by driving the rotary electric machine 17 (MG1). The core controller 134 outputs a cranking torque command Tr* which is required to start the internal combustion engine 14.

The voltage command generator 136 generates the voltage command VH* in accordance with the torque command value Tr* from the core controller 134 and the actual rotation speed Nm (the rotation speed obtained from the resolver 118) of the rotary electric machine 16 (MG2). Alternatively, in order to start the engine, the voltage command generator 136 generates the voltage command VH* in accordance with the torque command Tr* of the engine start command and the actual rotation speed Nm (typically zero) of the rotary electric machine 17 (MG1).

The generation of the voltage command VH* may be performed by using, for example, a VH* map. The VH* map may be stored in the storage unit 102 of the controller 24 such that the VH* map shows the correspondence between the voltage command VH* and the combination of the torque command value Tr* and the actual rotation speed Nm. The VH* map may be stored in the form of a table or a function.

The deviation calculator 138 calculates a voltage deviation $\Delta VH^*$ which is a deviation between the voltage command VH* and the measured value VH of the output voltage from the voltage converter 22. The electric power calculator 140 calculates the total electric power PHr (electric power command value) at the output paths 63, 64 in accordance with the voltage deviation $\Delta VH^*$. The total electric power PHr in accordance with the voltage deviation $\Delta VH^*$ may be calculated by using, for example, the following proportional integral (PI) calculation.

$$PHr = Kp^* \Delta VH + \Sigma(Ki^* \Delta VH) \qquad \text{[Equation 1]}$$

where Kp and Ki respectively represent a proportional control gain and an integral control gain. In these control gains, the capacitance value of the smoothing capacitor 42 is reflected.

The total electric power limiter 142 is an electric power limiter which is provided to protect the power supply. In a case of excessive power supply load based on the total electric power PHr, the total electric power limiter 142 controls the electric power command to the first battery 18 and the second battery 20 to be limited (reduced) to be equal to or lower than the upper limit. For example, the upper limit of the total electric power at the reference paths 63, 64 may be set such that when the total electric power PHr exceeds the upper limit, the upper limit is used as the electric power command value in place of the total electric power PHr.

The upper limit of the total electric power is set in the storage unit 102. Different limit values are set for the series and the parallel connections between the first battery 18 and the second battery 20. As described above, because it is possible to better handle a high output power with the series connection than with the parallel connection, the upper limits are set as Psmax<Ppmax (where Psmax represents the upper limit in the series connection and Ppmax represents the upper limit in the parallel connection). As described below, the total electric power limiter 142 sets one of Psmax (upper limit for serial connection) and Ppmax (upper limit for parallel connection) as the upper limit of the total electric power in accordance with the command from the series/parallel switch determining unit 146.

When the final total electric power command PH* (=PHr, Ppmax, or Psmax) is output from the total electric power limiter 142, a control function unit (not shown) distributes the electric power command to the first battery 18 and the second battery 20. A modified torque command value in accordance with the total electric power command PH* is also generated. Further, PWM signals to start the switching elements of the inverters 108, 110 are generated based on the modified torque command value.

The electric current calculator 144 obtains an electric current estimated value Ir which is to be extracted from the first battery 18 and the second battery 20 while driving a motor, or charged to both of the batteries while regenerating power, in accordance with the total electric power PHr output from the electric power calculator 140 and the voltage measured value VH at the output paths 63, 64 of the voltage converter 22 obtained from the output voltage sensor 112.

It should be noted that although the voltage measured value VH sensed by the output voltage sensor 112 is used as the voltage value at the output paths 63, 64 of the voltage converter 22 in FIG. 10, the voltage command value VH* may be used instead.

The SOC calculator 150 calculates respective SOCs of the first battery 18 and the second battery 20. For example, the SOC calculator 150 calculates the respective SOC_B1 and SOC_B2 of the first battery 18 and the second battery 20 based on the SOC map which is stored in the storage unit 102 and defines the correspondence between the SOC and the battery voltage value, electric current value, and temperature.

The battery tolerable electric current estimator 148 obtains a tolerable electric power of the first battery 18 and the second battery 20 in accordance with the SOC values SOC_B1, SOC_B2 of the first battery 18 and the second battery 20, and the battery temperatures TB1, TB2 of the first battery 18 and the second battery 20. For example, the battery tolerable electric power estimator 148 may obtain the tolerable electric power of the first battery 18 and the second battery 20 by using these values and the tolerable electric power value map.

Tolerable electric power value maps for each of the first battery 18 and the second battery 20 are stored in the storage unit 102 of the controller 24. The tolerable electric power value map stores the correspondence between a tolerable electric power value and SOC for each battery temperature. The tolerable electric power value maps are generated for both of a dischargeable tolerable electric power and a chargeable tolerable electric power. The tolerable electric power value maps may be stored in the form of a table or a function.

The battery tolerable electric current estimator 148 selects an electric power curve corresponding to the first battery temperature TB1 by referring to the tolerable electric power value map of the first battery 18. From the electric power curve, the battery tolerable electric current estimator 148 further obtains a tolerable electric power value Pr1 when the SOC of the first battery 18 is an obtained value SOC_B1. Similarly, the battery tolerable electric current estimator 148 selects an electric power curve corresponding to the second battery temperature TB2 by referring to the tolerable electric power value map of the second battery 20. From the electric power curve, the battery tolerable electric current estimator 148 further obtains a tolerable electric power value Pr2 when the SOC of the second battery 20 is an obtained value SOC_B2.

Next, the battery tolerable electric current estimator 148 obtains tolerable electric current values I1max and I2max of the first battery 18 and the second battery 20, respectively in accordance with the obtained tolerable electric power values Pr1, Pr2 of the first battery 18 and the second battery 20 and the measured voltage values VB1, VB2 from the first battery voltage sensor 26 and the second battery voltage sensor 30.

The series/parallel switch determining unit 146 compares the electric current estimated value Ir obtained by the electric current calculator 144 and the tolerable electric current values I1max, I2max obtained by the battery tolerable current estimator 148 to switch the connection state between the first battery 18 and the second battery 20 based on the obtained comparison result. At the same time, the series/parallel switch determining unit 146 sets the upper limit of the total electric power in the total electric power limiter 142 to either one of the upper limit in series connection Psmax and the upper limit in parallel connection Ppmax.

When the first battery 18 and the second battery 20 are connected in series and the current estimated value Ir exceeds the lower one of the tolerable electric current values I1max, I2max of the first battery 18 and the second battery 20, the series/parallel switch determining unit 146 controls the switching elements 66, 68, 70, 72 to switch the series connection (series connection for boosting and stepping down voltage or direct series connection) between the first battery 18 and the second battery 20 to a parallel connection (parallel connection for boosting and stepping down voltage). The series/parallel switch determining unit 146 further outputs a command to the total electric power limiter 142 to switch the upper limit of the total electric power from the upper limit in series connection Psmax to the upper limit in parallel connection Ppmax.

Figure 12:
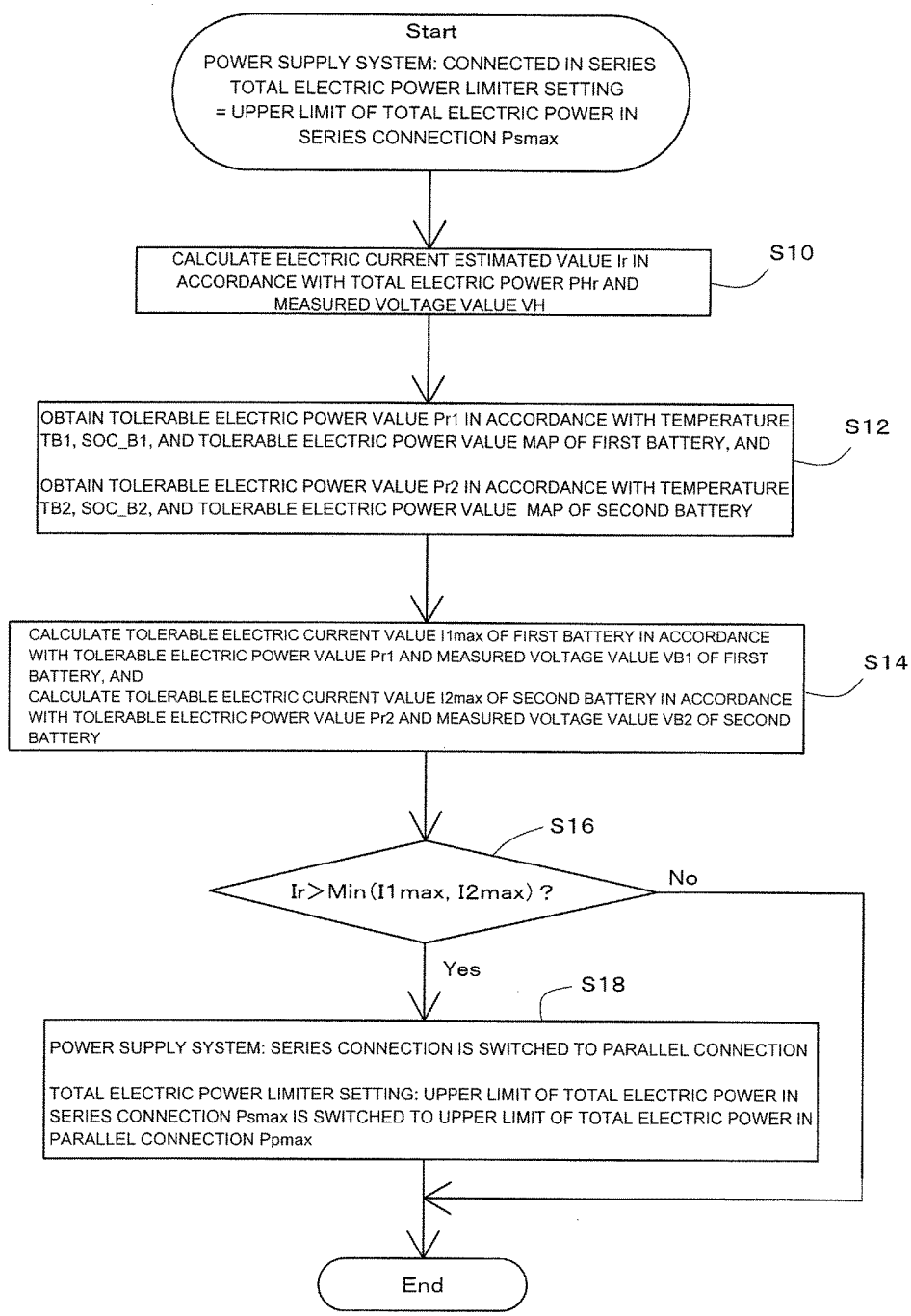
FIG. 12 is a flowchart for describing a switch control flow from the series connection to the parallel connection of the electric drive vehicle according to the first embodiment.

FIG. 12 shows an exemplary flowchart describing operations of the controller 24 in the above described switch control. It is assumed that the first battery 18 and the second battery 20 are initially connected in series. The connection state at this time may be the series connection for boosting and stepping voltage shown in FIGS. 2 to 5 or the direct series connection shown in FIG. 6. It is further assumed that the upper limit of the total electric power is set to the upper limit in series connection Psmax in the total electric power limiter 142.

As a process of the electric current calculator 144, the controller 24 obtains an electric current estimated value Ir in accordance with the total electric power PHr obtained by the electric power calculator 140 and the measured value VH at the output paths 63, 64 of the voltage converter 22 (S10). Next, as a process of the battery tolerable current estimator 148, the controller 24 obtains the tolerable electric power value Pr1 in accordance with the temperature TB1, the SOC value SOC_B1, and the tolerable electric power value map of the first battery 18. Similarly, the controller 24 obtains the tolerable electric power value Pr2 in accordance with the temperature TB2, the SOC value SOC_B2, and the tolerable electric power value map of the second battery 20 (S12).

Further, as a process of the battery tolerable current estimator 148, the controller 24 obtains a tolerable electric current value I1max of the first battery 18 in accordance with the tolerable electric power value Pr1 and the first battery voltage VB1. Similarly, the controller 24 obtains a tolerable electric current value I2max of the second battery 20 in accordance with the tolerable electric power value Pr2 and the second battery voltage VB2 (S14).

Next, as a process of the series/parallel switch determining unit 146, the controller 24 determines whether the electric current estimated value Ir exceeds at least one (the one with the electric current limitation) of the tolerable electric current values I1max, I2max of the first battery 18 and the second battery 20 (S16).

When the electric current estimated value Ir does not exceed either one of the tolerable electric current values I1max, I2max of the first battery 18 and the second battery 20, the controller 24 finishes the control flow. Specifically, the controller 24 maintains the connection state between the first battery 18 and the second battery 20 in a series connection, and also maintains the upper limit of the total electric power in the total electric power limiter 142 at the upper limit in series connection Psmax.

When the electric current estimated value Ir exceeds at least one of the tolerable electric current values I1max, I2max of the first battery 18 and the second battery 20, the controller 24 changes the ON/OFF pattern of the switching elements 66, 68, 70, 72 of the voltage converter 22 to switch the series connection (series connection for boosting and stepping down voltage or direct series connection) between the first battery 18 and the second battery 20 to a parallel connection (parallel connection for boosting and stepping down voltage). Further, the controller 24 outputs a command to the total electric power limiter 142 to switch (increase) the upper limit of the total electric power from the upper limit in series connection Psmax to the upper limit in parallel connection Ppmax (S18). In response to the switch command, the total electric power limiter 142 switches the upper limit of the total electric power from the upper limit in series connection Psmax to the upper limit in parallel connection Ppmax.

As described above, in the present embodiment, when a large electric current is expected, the connection between the first battery 18 and the second battery 20 is switched from a series connection to a parallel connection. In this way, an output of a larger electric current becomes possible than with the series connection maintained. As a result, a high output power can be obtained from the first battery 18 and the second battery 20.

In addition, in the present embodiment, so called "feed-forward control" is performed in which a connection switch is performed in accordance with not the actual torque but the torque command value Tr*. In comparison with the connection switch in accordance with the actual torque, a rapid response to a high output power request becomes possible, improving the drivability.

<Second Embodiment of Connection Switch Control>

Figure 13:
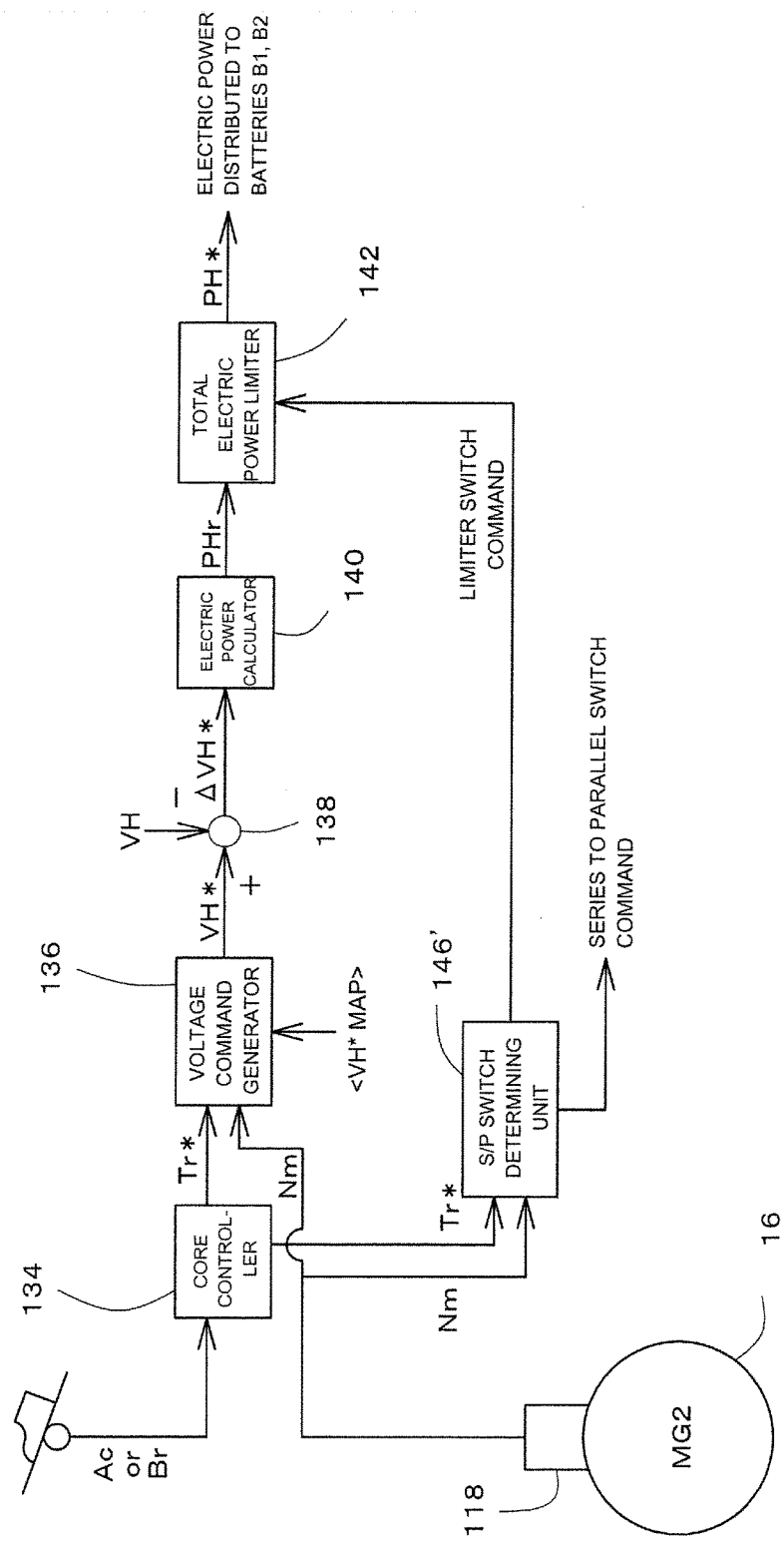
FIG. 13 is a control block diagram for describing a switch control from a series connection to a parallel connection of an electric drive vehicle according to a second embodiment.

In the above described switch control, the series/parallel switch determining unit 146 determines whether or not to switch the series/parallel connection by waiting for the calculation and output of the total electric power PHr from the electric power calculator 140. However, the switching of the series/parallel connection may be determined in accordance with a parameter which is output further upstream in the control flow shown in the control block diagram in FIG. 11. FIG. 13 shows an exemplary control block diagram of the controller 24 according to a second embodiment. The function units that are the same as those in FIG. 11 are shown with the same reference numerals. The descriptions of the function units overlapping with those in the embodiment shown in FIG. 11 are omitted.

In the present embodiment, the series/parallel switch determining unit 146' receives the torque command value Tr* output from the core controller 134 and the actual rotation speed Nm of the rotary electric machines 16 (MG2), 17 (MG1). When at least one of the torque command value Tr* and the actual rotation speed Nm of the rotary electric machines 16 (MG2), 17 (MG1) is rapidly changed (rapidly increased or decreased), the series/parallel switch determining unit 146' sets the connection between the first battery 18 and the second battery 20 to a parallel connection.

As described above, the total electric power PHr which is used as a basis to calculate the electric current estimated value Ir is calculated from the voltage deviation ΔVH*. According to the VH* map, the rapid increase of the voltage deviation ΔVH* is caused by a rapid increase of the torque command value Tr* or the actual rotation speed Nm of the rotary electric machines 16, 17. In other words, when the torque command value Tr* or the actual rotation speed Nm of the rotary electric machines 16, 17 is increased rapidly, a request for a large electric current is likely to be issued.

Similarly, a large electric current may also occur with a rapid decrease in the torque command value Tr* or the actual rotation speed Nm of the rotary electric machines 16, 17. For example, in the hybrid vehicle shown in FIG. 1, it is assumed that the drive wheels 123 are driven by both of the drive sources, namely, the rotary electric machine 16 (MG2) and the internal combustion engine 14. The driving force of the internal combustion engine 14 is distributed by the power distributer 125 such that some of the driving force is allocated for power generation driving of the rotary electric machine 17 (MG1).

It is assumed below that the drive wheels 123 temporally skid (slip) under such drive conditions. When the drive wheels 123 skid, because the actual rotation speed of the rotary electric machine 16 is rapidly increased, a large electric current request may be issued. Further, when the skid state is returned to the grip state, the actual rotation speed Nm of the rotary electric machine 16, which is a driving source, is rapidly decreased. As a result, the total electric power PHr is rapidly decreased in accordance with the above described VH* map. In contrast, the output of the internal combustion engine 14 cannot be controlled as rapidly as the rotary electric machine 16. As a result, the power generation driving of the rotary electric machine 17 (MG1) is maintained.

In view of the electric power balance at this occasion, the amount of the regenerated power is maintained, while the electric power for driving a motor is rapidly decreased when the grip state is restored. In other words, the balance between the electric power for driving a motor and the regenerated power is lost such that the regenerated power is rapidly increased and a large current flows into the first battery 18 and the second battery 20.

Such a large electric current due to a lost balance between the regenerated power and the electric power for driving a motor may occur not only with hybrid vehicles, but also with vehicles having two or more driving sources with different control response speeds, such as electric vehicles provided with flywheels.

In view of the above discussion, in the present embodiment, because it can be assumed that a large electric current request may be issued when at least one of the torque command value Tr* and the actual rotation speed Nm of the rotary electric machines 16, 17 is rapidly changed (rapidly increased or decreased), the connection state between the first battery 18 and the second battery 20 is changed from a series connection to a parallel connection when such a situation occurs.

Figure 14:
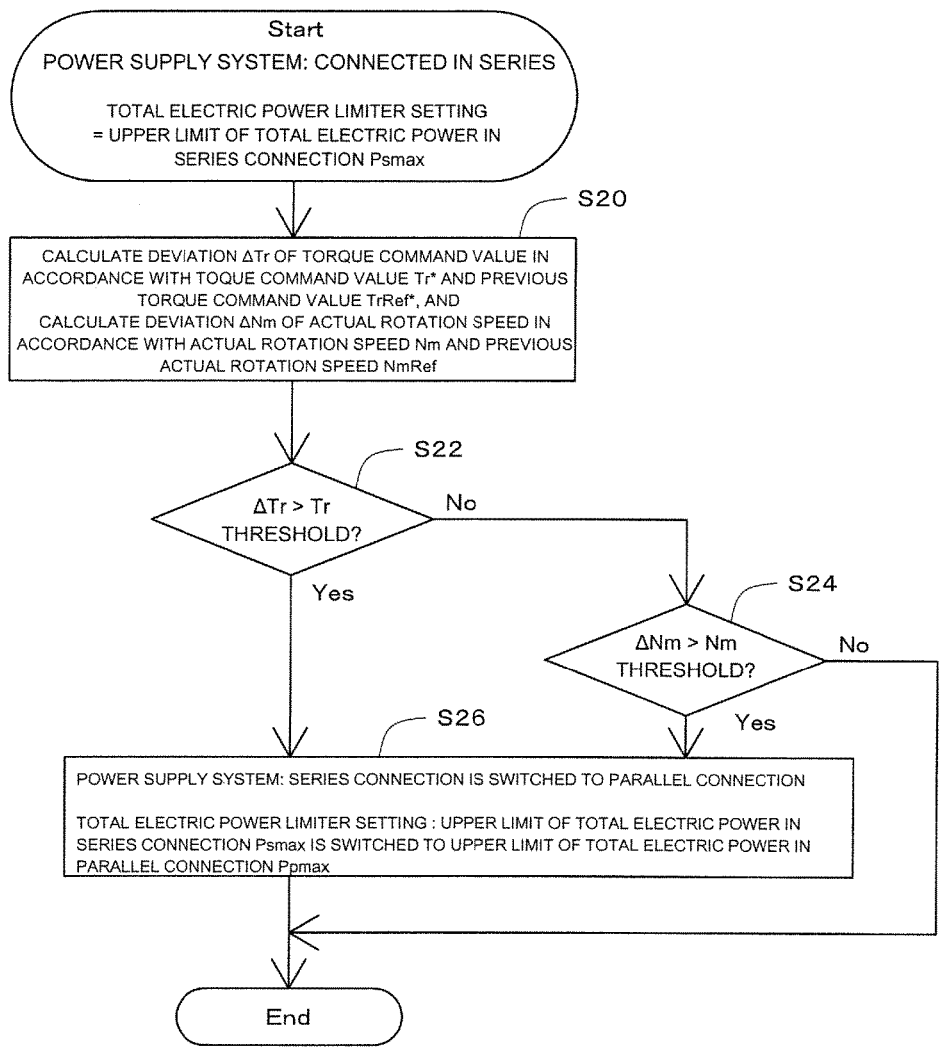
FIG. 14 is a flowchart for describing a switch control flow from the series connection to the parallel connection of the electric drive vehicle according to the second embodiment.

FIG. 14 shows an exemplary flowchart of a switch control according to the present embodiment. It is assumed, similarly to the embodiment shown in FIG. 12, that the first battery 18 and the second battery 20 are initially connected in series (series connection for boosting and stepping down voltage or direct series connection), and the upper limit of the total electric power is set to the upper limit in series connection Psmax in the total electric power limiter 142.

Although the rotary electric machine 16 (MG2) alone is described in the descriptions below in order to facilitate understanding, the rotary electric machine 17 may be used instead.

As a process of the series/parallel switch determining unit 146', the controller 24 receives the torque command value Tr* output from the core controller 134. The controller 24 also receives an actual rotation speed Nm of the rotary electric machine 16 (MG2) from the resolver 118. For the torque command value Tr*, the controller 24 calculates a deviation ΔTr* from the previous torque command value TrRef* (in other words, a changed amount of the torque command value). For the actual rotation speed Nm, the controller 24 also calculates a deviation ΔNm from the previous actual rotation speed NmRef (in other words, a changed amount of the rotation speed) (S20).

Next, as a process of the series/parallel switch determining unit 146', the controller 24 determines whether the torque deviation ΔTr* exceeds a predetermined torque threshold (Tr threshold) (S22). If not, the controller 24 further determines whether the rotation speed deviation ΔNm exceeds a predetermined rotation speed threshold (Nm threshold) (S24).

When the deviations (changed amounts) do not exceed the thresholds in steps S22 and S24, the initial states are maintained. When at least one of the deviations exceeds the thresholds in step S22 or step S24, as a process of the series/parallel switch determining unit 146', the controller 24 changes the ON/OFF pattern of the switching elements 66, 68, 70, 72 of the voltage converter 22 to switch the series connection (series connection for boosting and stepping down voltage or direct series connection) between the first battery 18 and the second battery 20 to a parallel connection (parallel connection for boosting and stepping down voltage). Further, the controller 24 outputs a command to the total electric power limiter 142 to switch (increase) the upper limit of the total electric power from the upper limit in series connection Psmax to the upper limit in parallel connection Ppmax (S26).

Although both of the rapid changes in the torque command value Tr* and the actual rotation speed Nm are sensed in the above described flowchart, only one of the rapid changes may be sensed instead. For example, the controller 24 may perform the control flow in which one of step S22 or step S24 is omitted.

According to the second embodiment described above, it becomes possible, without waiting for the outputs of the voltage command VH* and the total electric power PHr, to obtain the conditions that the electric current estimated value Ir becomes large in accordance with a parameter output by a control block issued at a more upstream point than those outputs, and thereby switch the series connection between the first battery 18 and the second battery 20 to a parallel connection. Because the connection switch control can be brought forward by the processing time required for the calculation of the voltage command value VH* and the total electric power PHr, it becomes possible to more rapidly respond to a high output request.

<Third Embodiment of Connection Switch Control>

Figure 15:
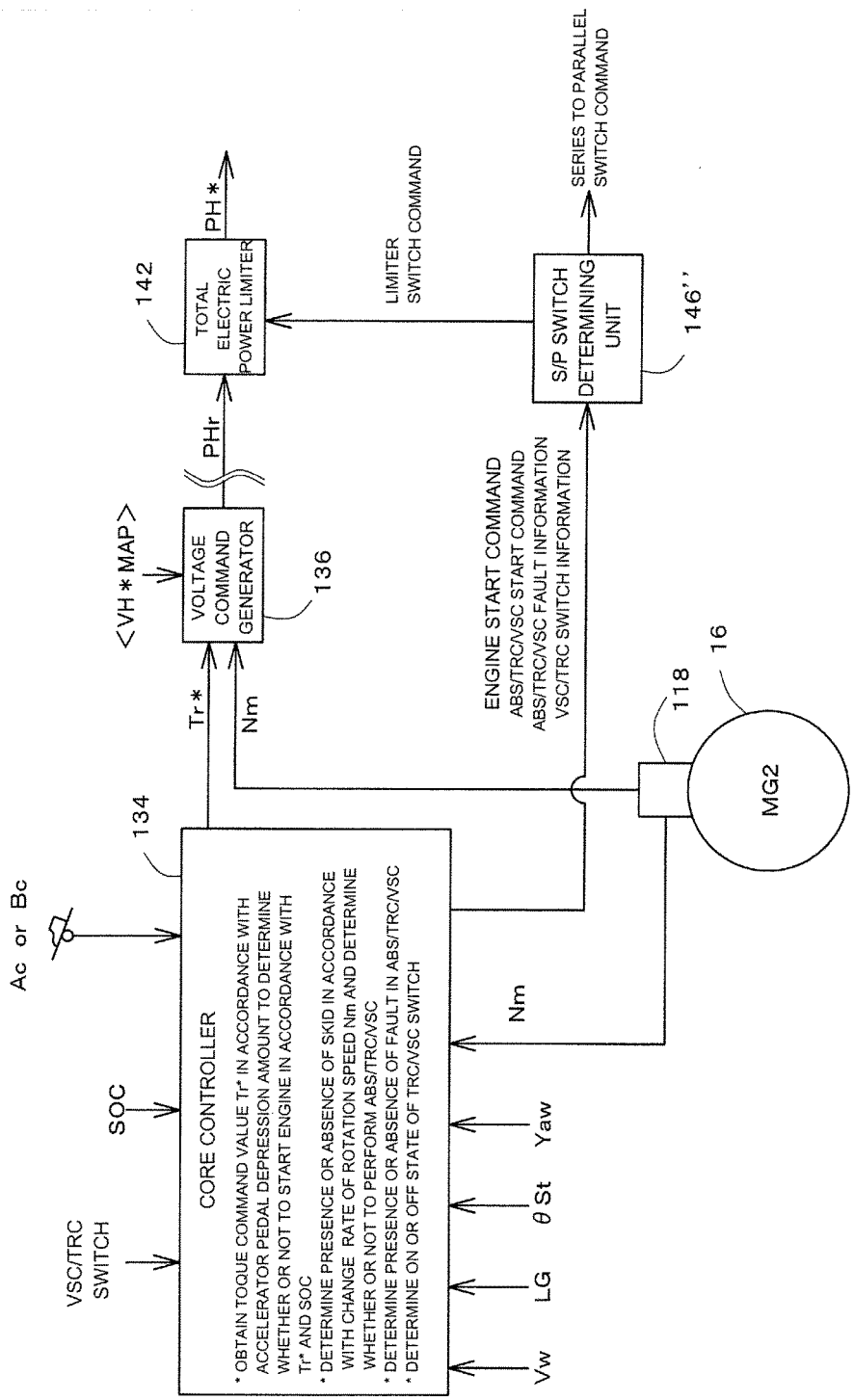
FIG. 15 is a control block diagram for describing a switch control from a series connection to a parallel connection of an electric drive vehicle according to a third embodiment.

In this embodiment, in comparison with the above described two embodiments, the switch control is brought even further forward. FIG. 15 shows a control block diagram according to the present embodiment. Similarly to FIG. 13, the function units that are the same as those in FIG. 11 are shown with the same reference numerals. The descriptions of the function units overlapping with those in the embodiment in FIG. 11 are omitted. Furthermore, in FIG. 15, the configuration between the voltage command generator 136 and the total electric power limiter 142 is omitted due to limitations of space.

In the present embodiment, the series/parallel switch determining unit 146" sets the connection between the first battery 18 and the second battery 20 to a series connection when vehicle control which causes a rapid change in the torque command value or the actual rotation speed of the rotary electric machines 16, 17 is performed.

As vehicle control which causes a rapid change in the torque command value or the actual rotation speed of the rotary electric machines 16, 17, the following four controls can be listed: engine start control, an anti-lock braking system (ABS), a traction control (TRC) system, and a vehicle stability control (VSC) system.

When starting the engine, the internal combustion engine 14 is driven by outputting a cranking torque from the rotary electric machine 17 (MG1). This output of the cranking torque causes a rapid increase of the torque command value. It is further known that the torque change is large when starting the internal combustion engine 14 (from the first to the complete combustion). In order to restrict the torque change of the driving system as a whole, including the internal combustion engine 14 and the rotary electric machine 16 (MG2), a torque command which compensates the torque change of the internal combustion engine 14 is sent to the rotary electric machine 16 (MG2). As a result, the torque change of the rotary electric machine 16 (MG2) becomes large.

All of the ABS system, TRC system, and the VSC system are controls which are performed when the drive wheels 123 temporally skid (slip, lose grip). Because these systems are well-known techniques, they are only briefly described below. The ABS system is a braking control which is performed when the drive wheels 123 or driven wheels have slipped and locked at the time of braking of the vehicle. In this control, the regenerative brake, for which brake pressure control is relatively difficult, is switched to a hydraulic brake such that the brake pressure is adjusted by operating the hydraulic brake. By temporally lowering the brake pressure, the lock is released and the grip of the drive wheels 123 and the driven wheels can be restored.

The TRC system and the VSC system are both brake controls which are performed when the drive wheels 123 have slipped while being driven. The TRC system is a control to restore the grip of the drive wheels 123 by lowering the output (torque command value) when the drive wheels 123 skid at the time of starting or acceleration of the vehicle. The VSC system is a control to restore the grip of the drive wheels 123 and the driven wheels by lowering the output (torque command value) in response to sensed side skid of the drive wheels 123 and the driven wheels when the vehicle travels around a curve.

When the state of the drive wheels 123 shifts from a grip state to a skid state, the actual rotation speed Nm of the rotary electric machine 16 (MG2) changes rapidly. As a result, a request for a large electric current may occur. As described above, it is also possible that the electric power balance between the regenerated power and the electric power for driving a motor will be lost and a large electric current occurs when the grip state is restored from the skid state, or the regeneration is interrupted or the torque command value is lowered by performing the ABS/TRC/VSC control. Thus, in the present embodiment, when the drive wheels 123 slip, a series connection between the first battery 18 and the second battery 20 is switched to a parallel connection.

It is further preferable that a series connection between the first battery 18 and the second battery 20 is switched to a parallel connection even when the ABS system, TRC system, and VSC system are not in effect (set invalid). However, while it is possible to predict the occurrence of large electric current by sensing the skid of the drive wheels 123 and the driven wheels by performing the control of the vehicle when these vehicle controls are in effect, it becomes impossible to predict the occurrence of the large electric current because it becomes impossible to sense the skid of the drive wheels 123 or others while these vehicle controls are set invalid. Therefore, also in view of power supply protection, in the present embodiment, a series connection between the first battery 18 and the second battery 20 is switched to a parallel control when the ABS system, the TRC system, and the VSC system are set invalid, in preparation for the possible occurrence of a skid (in preparation for an occurrence of a large electric current).

The ABS system, the TRC system, and the VSC system may be set invalid when these systems experience a fault (determined to be in a fault condition). It is also possible that these systems will be turned OFF in a type of vehicle in which ON/OFF of the TRC system and the VSC system is possible with a switch or the like.

It should be noted that regarding the ABS system, because providing means for turning the ABS system OFF is prohibited by an ordinance of the Ministry of Land, Infrastructure, Transport and Tourism of Japan, the above description excludes an example with the ABS system turned OFF, but the OFF setting of the ABS system may be added to the above described conditions in countries and regions where such a setting is allowed.

As a process of the core controller 134, the controller 24 obtains the torque command value Tr* in accordance with the accelerator pedal depression amount Ac to determine whether or not to start the engine based on the obtained torque command value Tr*. The controller 24 determines whether or not to start the engine based also on the SOCs of the first battery 18 and the second battery 20.

As a process of the core controller 134, the controller 24 senses whether or not the drive wheels are locked in accordance with a change in the wheel speed sensed by the wheel speed sensor 122 to determine whether or not to perform the ABS control. The controller 24 further determines whether or not to perform the VSC control by sensing the side skid state of the vehicle from various information from the wheel speed sensor 122, the yaw rate sensor 130, the acceleration speed sensor 132, and the steering sensor 128. The controller 24 further senses a skid at the time of starting or acceleration of the vehicle by comparing the measured value of the wheel speed sensed by the wheel speed sensor 122 and the estimated vehicle speed in the grip state to determine whether or not to perform the TRC control.

As a process of the core controller 134, the controller 24 further obtains fault information of the ABS system, the TRC system, and the VSC system to stop the operation of the system when a fault occurs. The controller 24 determines whether the TRC system and the VSC system are ON or OFF. Such ON/OFF information is sent to the series/parallel switch determining unit 146".

Figure 16:
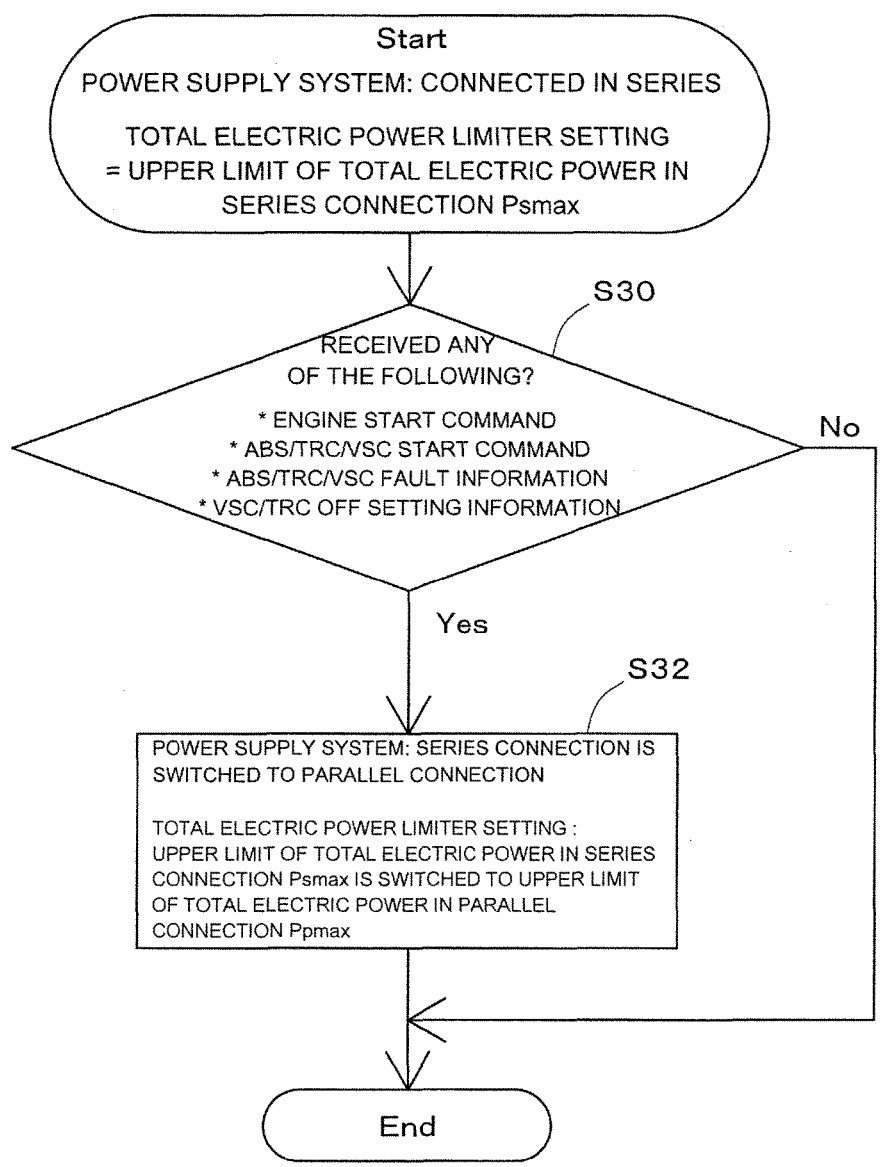
FIG. 16 is a flowchart for describing a switch control flow from the series connection to the parallel connection of the electric drive vehicle according to the third embodiment.

FIG. 16 shows an exemplary flowchart of a switch control according to the present embodiment. It is assumed, similarly to the embodiment shown in FIG. 12, that the first battery 18 and the second battery 20 are initially connected in series (series connection for boosting and stepping down voltage or direct series connection), and the upper limit of the total electric power is set to the upper limit in series connection Psmax in the total electric power limiter 142.

As a process of the series/parallel switch determining unit 146", the controller 24 determines whether or not the controller 24 has received, from the controller 134, any one of the engine start command, the ABS system start command, the TRC system start command, the VSC system start command, the fault information of any of the ABS/TRC/VSC systems, and ON/OFF setting information of the TRC system and the VSC system (S30). If not, the controller 24 maintains the switch control at the initial state. If any one of these signals is received, as a process of the series/parallel switch determining unit 146", the controller 24 changes the ON/OFF pattern of the switching elements 66, 68, 70, 72 of the voltage converter 22 such that the series connection (series connection for boosting and stepping down voltage or direct series connection) between the first battery 18 and the second battery 20 is changed to a parallel connection (parallel connection for boosting and stepping down voltage). The controller 24 further outputs a command to the total electric power limiter 142 to switch (increase) the upper limit of the total electric power from the upper limit in series connection Psmax to the upper limit in parallel connection Ppmax (S32).

Figure 17:
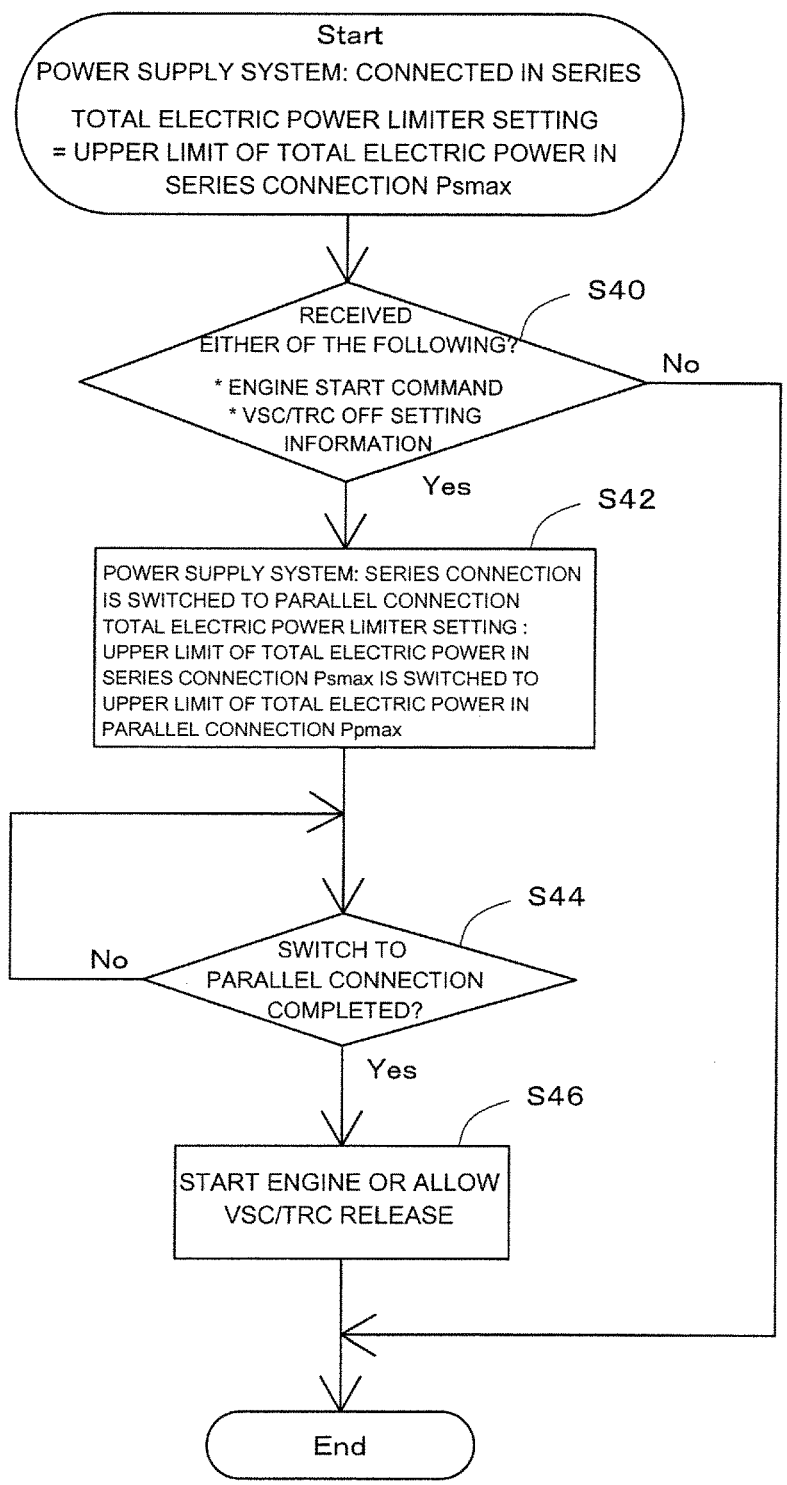
FIG. 17 is a flowchart for describing another example of the switch control flow from the series connection to the parallel connection of the electric drive vehicle according to the third embodiment.

It should be noted that in place of the flowchart in FIG. 16, some signal processes may be performed as shown in FIG. 17. In this flowchart, various controls are performed by waiting for the completion of the connection switch from the series connection to the parallel connection. The initial states are identical to those in FIG. 16.

As a process of the series/parallel switch determining unit 146", the controller 24 determines whether or not the engine start command or the OFF setting information of at least one of the TRC system and the VSC system has been received (S40). If not, the controller 24 maintains the switch control at the initial state.

If any one of these signals is received, as a process of the series/parallel switch determining unit 146", the controller 24 changes the ON/OFF pattern of the switching elements 66, 68, 70, 72 of the voltage converter 22 such that the series connection (series connection for boosting and stepping down voltage or direct series connection) between the first battery 18 and the second battery 20 is changed to a parallel connection (parallel connection for boosting and stepping down voltage). The controller 24 further outputs a command to the total electric power limiter 142 to switch (increase) the upper limit of the total electric power from the upper limit in series connection Psmax to the upper limit in parallel connection Ppmax (S42).

As a process of the series/parallel switch determining unit 146", the controller 24 also confirms whether or not the switch to the parallel connection has been completed (S44). If so, as a process of the series/parallel switch determining unit 146", the controller 24 returns, to the core controller 134, a permission command to enable the request received in step S40, namely a request to start the engine, to set the VSC system OFF, or to set the TRC system OFF (S46).

As described above, unlike the second embodiment, in the third embodiment, conditions causing a large electric current estimated value Ir are obtained in accordance with only the parameters output from the core controller 134 without waiting for the actual rotation speed Nm to be obtained from the resolver 118, and thereby the connection is switched from the series connection to a parallel connection. With such a configuration, because the connection switch control can be brought forward by the sampling timing of the resolver 118, a more rapid response to the high output request becomes possible.

It should be noted that in the above described first to third embodiments, the switch control in accordance with the command electric current, the switch control in accordance with the torque and the rotation speed of the rotary electric machine, and the switch control in accordance with the vehicle control are indicated as independent control blocks, but the present invention is not limited to these embodiments. For example, all or any desired two of these three controls may be combined.

Figure 18:
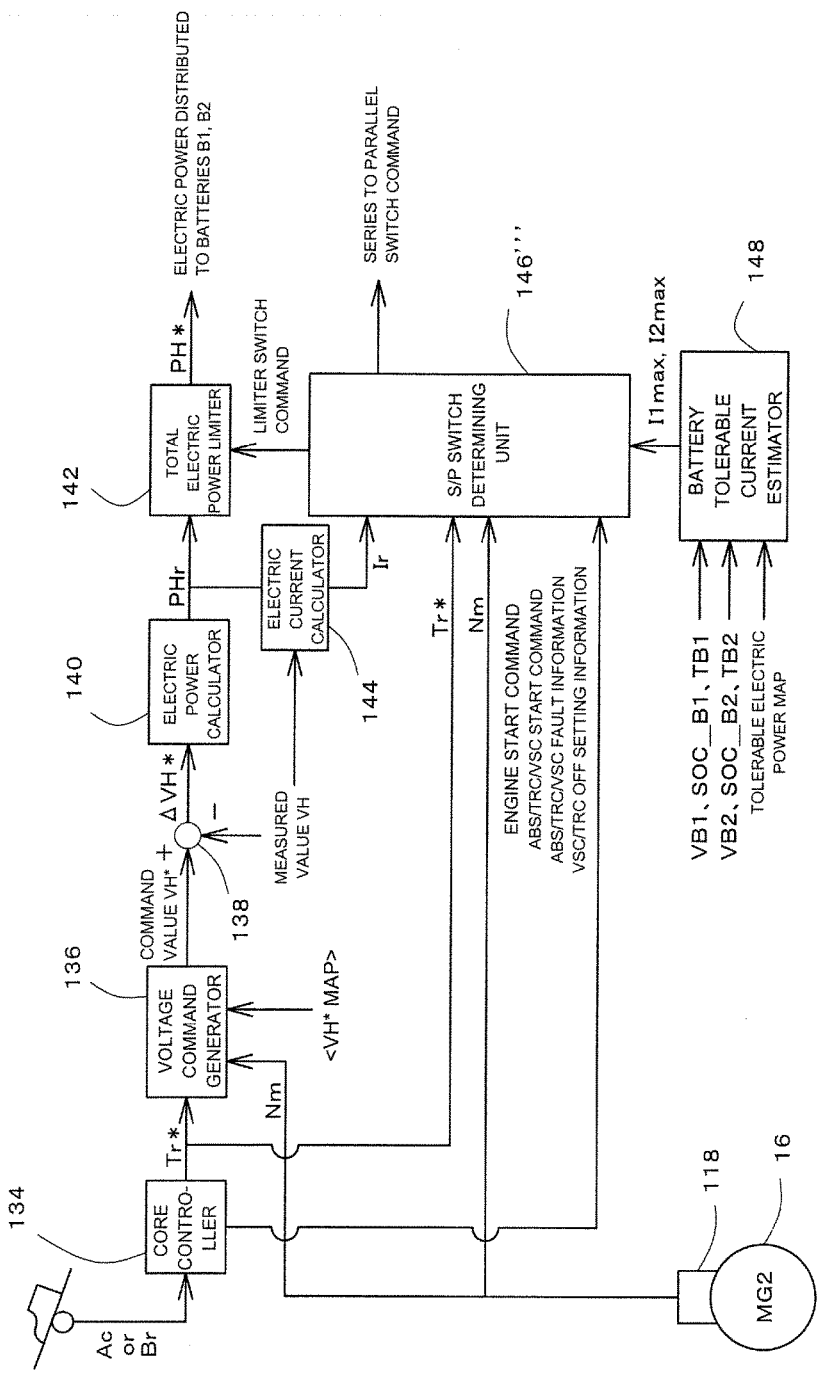
FIG. 18 is a control block diagram combining the first to third embodiments.

FIG. 18 shows a control block diagram in which the first to the third embodiments are combined. It should be noted that similarly to the above described drawings, although the rotary electric machine 16 alone is indicated in FIG. 18, the rotary electric machine 16 may be replaced with the rotary electric machine 17 (MG1).

The series/parallel switch determining unit 146''' receives the electric current estimated value Ir from the electric current calculator 144, and also tolerable electric current values (maximum electric current values) I1max, I2max of the first battery 18 and the second battery 20 from the battery tolerable current estimator 148.

The series/parallel switch determining unit 146''' further receives the torque command value Tr* from the core controller 134 to obtain a deviation ΔTr from the previous torque command value, and also receives the actual rotation speed Nm of the rotary electric machine 16 from the resolver 118 to obtain a deviation ΔNm from the previous actual rotation speed.

The series/parallel switch determining unit 146''' receives, from the core controller 134, the engine start command, the ABS system start command, the TRC system start command, the VSC system start command, fault information of any of the ABS/TRC/VSC systems, and OFF setting information of the TRC system and the VSC system.

When any one of the obtained information matches with the conditions causing the large electric current, the series/parallel switch determining unit 146''' switches the series connection between the first battery 18 and the second battery 20 to a parallel connection.

Figure 19:
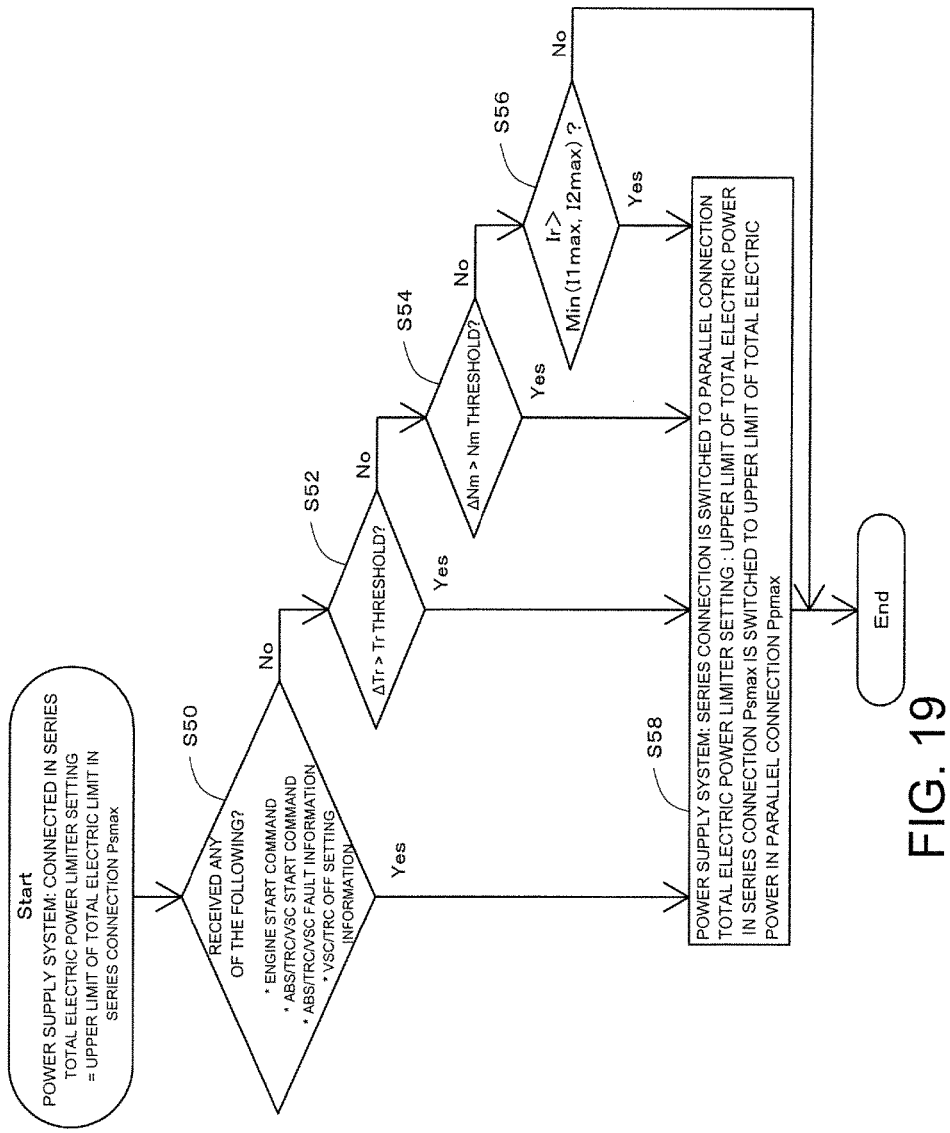
FIG. 19 is a flowchart combining the first to third embodiments.

FIG. 19 shows an exemplary flowchart of the switch control by the series/parallel switch determining unit 146'''. First, as a process of the series/parallel switch determining unit 146''', the controller 24 determines whether the controller 24 has received, from the core controller 134, any one of the engine start command, the ABS system start command, the TRC system start command, the VSC system start command, the fault information of any one of ABS/TRC/VSC systems, and OFF setting information of the TRC system and the VSC system (S50).

If not, as a process of the series/parallel switch determining unit 146''', the controller 24 determines whether or not the deviation ΔTr of the torque command value of the rotary electric machine 16 exceeds a predetermined torque threshold (S52). If not, as a process of the series/parallel switch determining unit 146''', the controller 24 determines whether or not the actual rotation speed deviation ΔNm of the rotary electric machine 16 exceeds a predetermined actual rotation speed threshold (S54). If not, the controller 24 determines whether or not the electric current estimated value Ir exceeds the lower one of the tolerable electric current values I1max, I2max of the first battery 18 and the second battery 20 (S56). If not, the controller 24 maintains the switch control at the initial state.

In contrast, as a process of the series/parallel switch determining unit 146''', the controller 24 changes the ON/OFF pattern of the switching elements 66, 68, 70, 72 of the voltage converter 22 to switch the series connection between the first battery 18 and the second battery 20 to a parallel connection if one of the following conditions is satisfied: in step 50, any of the above vehicle control information is received; in step S52, the torque deviation ΔTr exceeds the torque threshold; in step S54, the actual rotation speed deviation ΔNm exceeds the rotation speed threshold; and in step S56, the electric current estimated value Ir exceeds the tolerable electric current. The controller 24 further outputs a command to the total electric power limiter 142 to switch (increase) the upper limit of the total electric power from the upper limit in series connection Psmax to the upper limit in parallel connection Ppmax (S58).

<Configuration of Second Voltage Converter>

Figure 20:
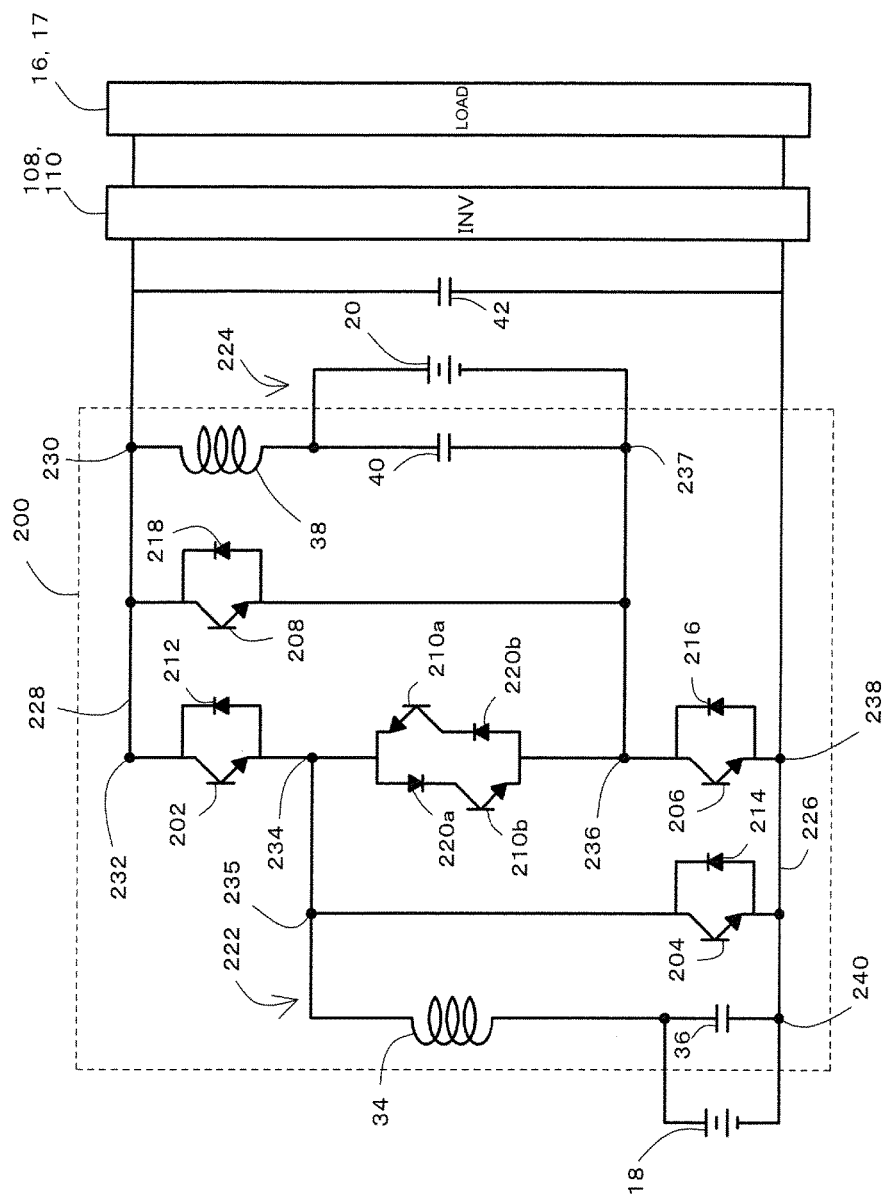
FIG. 20 is another example of a voltage converter of an embodiment according to the present invention.

Although the above embodiments describe only the voltage converter 22 according to FIG. 1, embodiments according to the present invention are not limited to this case. For example, in the place of the voltage converter 22, a second voltage converter 200 as shown in FIG. 20 may be used. In FIG. 20, elements that are the same as those described in the above embodiments are shown with the same reference numerals, and their descriptions are omitted.

The output path of the second voltage converter 200 includes a reference path 226 which is connected to the negative side of the first battery 18 and the second battery 20, and a high voltage path 228 through which a high voltage boosted by the second voltage converter 200 is output.

The second voltage converter 200 is provided with switching elements 202, 204, 206, 208, 210a, 210b. The forward direction of the electric current flow of these switching elements is directed from the high voltage path 228 to the reference path 226. Diodes 212, 214, 216, 218, 220a, 220b are respectively connected in anti-parallel to these switching elements. It should be noted that the diode 220a is connected in anti-parallel to the switching element 210a, while the diode 220a is connected in series to the switching element 210b. It should be also noted that the diode 220b is connected in anti-parallel to the switching element 210b, while the diode 220b is connected in series to the switching element 210a.

The switching elements 202, 210a, 210b, 206 are connected in series from the high voltage path 228 to the reference path 226. Diodes 212, 220a, 220b, 216 are respectively connected in anti-parallel to the switching elements 202, 210a, 210b, 206.

The switching element 204 and the diode 214 which is connected in anti-parallel to the switching element 204 are connected in parallel to the switching elements 210a, 210b, 206. Specifically, the switching element 204 and the diode 214 (arm) are connected to a node 234 between the switching element 202 which is the first switching element from the high voltage path 228 and the second switching element 210a, and to the reference path 226.

The switching element 208 and the diode 218 which is connected in anti-parallel to the switching element 208 are connected in parallel to the switching elements 202, 210a, 210b. Specifically, the switching element 208 and the diode 218 are connected to a node 236 between the switching element 210b which is the third switching element from the high voltage path 228 and the fourth switching element 206, and to the high voltage path 228.

The first reactor 34 is connected in series with the first battery 18 and the first capacitor 36 is connected in parallel with the first battery 18. Similarly, the second reactor 38 is connected in series with the second battery 20 and the second capacitor 40 is connected in parallel with the second battery 20. Further, the smoothing capacitor 42 is connected in parallel with a load.

A first low voltage circuit 222 including the first battery 18, the first reactor 34, and the first capacitor 36 is connected in parallel with the switching element 204 and the diode 214.

Specifically, the first low voltage circuit 222 is connected to anode 235 which is connected to the node 234, and to the reference path 226.

Similarly, a second low voltage circuit 224 including the second battery 20, the second reactor 38, and the second capacitor 40 is connected in parallel with the switching element 208 and the diode 218. Specifically, the second low voltage circuit 224 is connected to a node 237 which is connected to the node 236, and to the high voltage path 228.

The series connection and the parallel connection in the second voltage converter 200 are described by referring to FIGS. 21 to 25. It should be noted that similarly to the description in FIGS. 2 to 10, the three connection patterns assumed in embodiments according to the present invention, namely, <(1) series connection for boosting and stepping down voltage>, <(2) direct series connection>, and <(3) parallel connection for boosting and stepping down voltage> are described.

In FIGS. 21 to 25, the switching elements 202, 204, 206, 208, 210a, 210b are illustrated with a switch symbol indicating the electric current forward direction. Further, elements of the voltage converter 200 are described with the following reference letters and numerals: "B1" representing the first battery 18, "L1" the first reactor 34, "C1" the first capacitor 36, "B2" the second battery 20, "L2" the second reactor 38, "C2" the second capacitor 40, "CH" the smoothing capacitor 42, "S1", "S2", "S3", "S4", "S5a", "S5b" the switching elements 202, 204, 206, 208, 210a, 210b in this order, and "D1", "D2", "D3", "D4", "D5a", "D5b" the diodes 212, 214, 216, 218, 220a, 220b in this order. The rotary electric machines 16, 17 to which the electric power is supplied are simply represented by load "LD". The inverters 108, 110 are not shown.

<(1) Series Connection for Boosting and Stepping Down Voltage>

Figure 21:
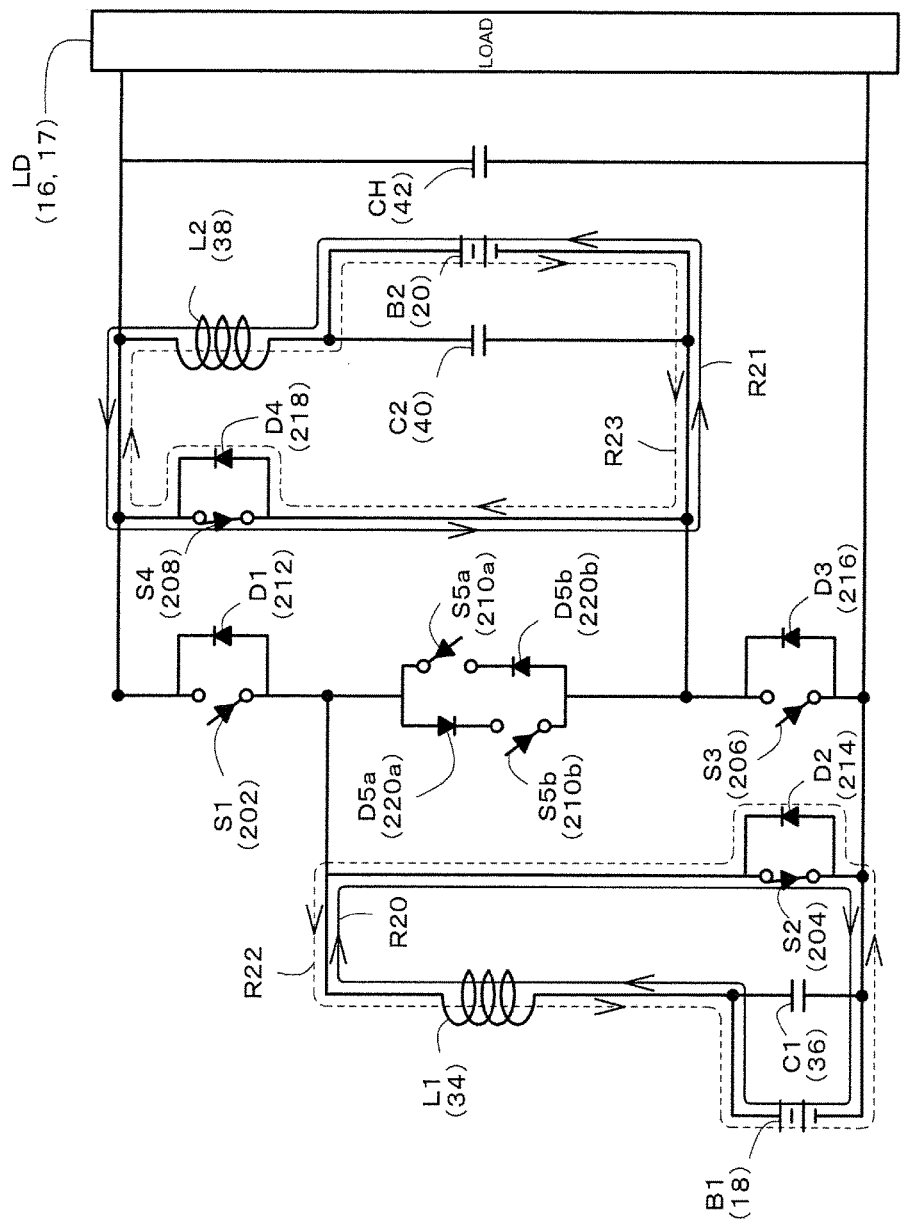
FIG. 21 is a schematic diagram for describing an operation (charging while driving a motor and discharging while regenerating power in a series connection for boosting and stepping down the voltage and in a first mode in a parallel connection for boosting and stepping down voltage) of a voltage converter of an embodiment according to the present invention.
Figure 22:
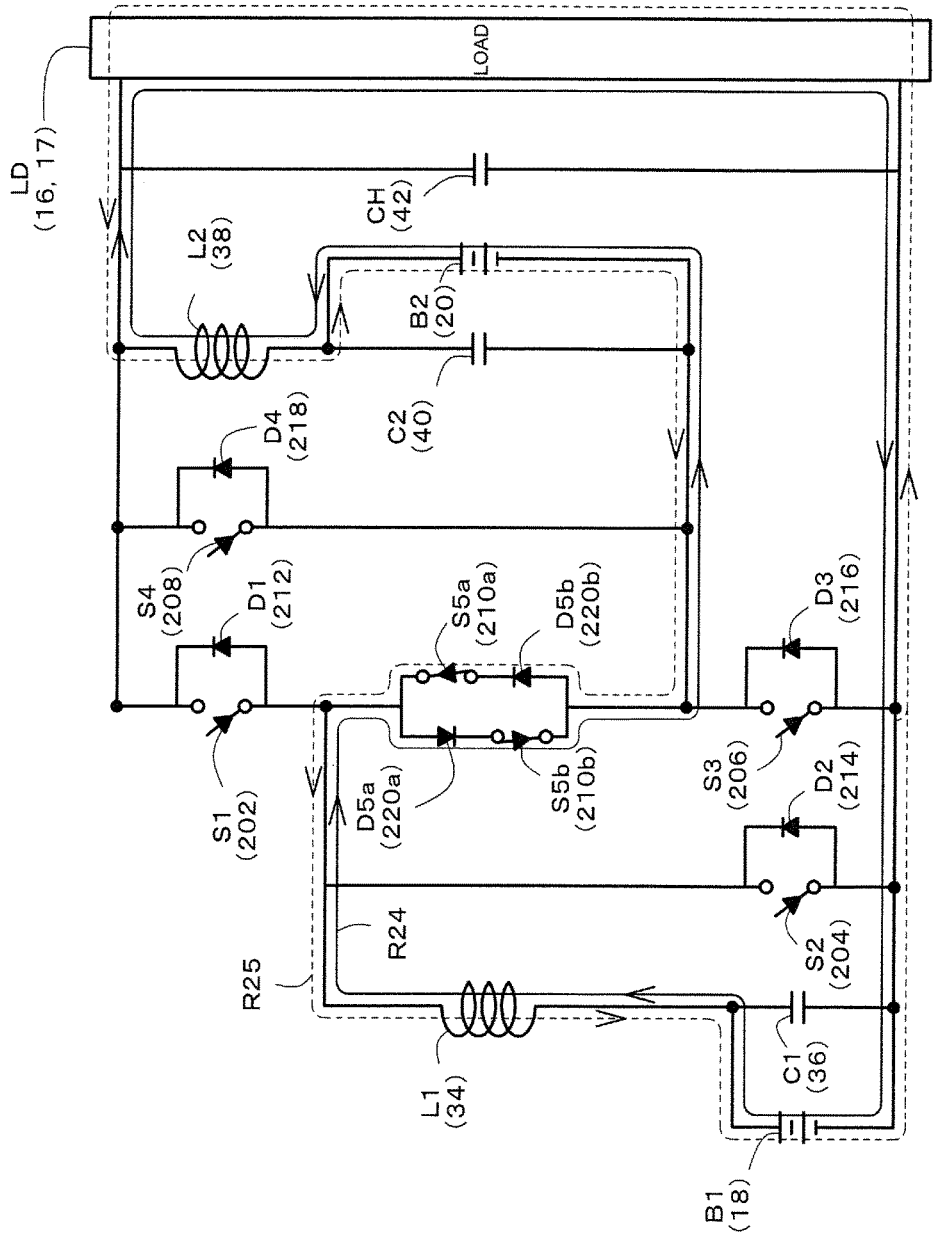
FIG. 22 is a schematic diagram for describing an operation (discharging while driving a motor and charging while regenerating power in a series connection for boosting and stepping down voltage) of a voltage converter of an embodiment according to the present invention.

FIGS. 21, 22 show exemplary boosting and stepping down voltage operations with B1 (18) and B2 (20) connected in series. In this connection state (mode), the switching elements S1 (202) and S3 (206) are fixed to OFF, while S2 (204), S4 (208), S5a and S5b (210a and 210b) are turned ON and OFF.

Among the boosting and stepping down voltage operations, FIG. 21 shows a charging process while driving a motor (shown in solid lines) and a discharging process while regenerating power (shown in broken lines), as examples. In the processes, (S1 (202) is fixed to OFF), S2 (204) is turned ON, (S3 (206) is fixed to OFF), S4 (208) is turned ON, S5a (210a) and S5b (210b) are turned OFF.

In this state, in a charging process while driving a motor (shown in solid lines), which is a boosting voltage operation, a circuit R20 is formed in which an electric current flows in the order of B1 (18)→L1 (34)→S2 (204)→B1 (18). A circuit R21 in which an electric current flows in the order of B2 (20)→L2 (38)→S4 (208)→B2 (20) is also formed. Electric energy (electromagnetic energy) is charged in L1 (34) by the formed circuit R20. Similarly, electric energy is charged in L2 (38) by the formed circuit R21.

In the discharging process while regenerating power (shown in broken lines), which is a stepping down voltage operation, a circuit R22 is formed in which an electric current flows in the order of L1 (34)→B1 (18)→D2 (214)→L1 (34). A circuit R23 in which an electric current flows in the order of L2 (38)→B2 (20)→D4 (218)→L2 (38) is also formed. The electric energy in L1 (34) is discharged to B1 (18) by the formed circuit R22. Similarly, the electric energy in L2 (38) is discharged to B2 (20) by the formed circuit R23.

Among the boosting and stepping down voltage operations in series connection, FIG. 22 shows a discharging process while driving a motor (shown in solid lines), which is a boosting voltage operation, and a charging process while regenerating power (shown in broken lines), which is a stepping down voltage operation, as examples. In these processes, S1 (202) is fixed to OFF, S2 (204) is turned OFF, S3 (206) is fixed to OFF, S4 (208) is turned OFF, and S5a (210a) and S5b (210b) are turned ON.

In this state, in the discharging process while driving a motor (shown in solid lines), a circuit R24 is formed in which an electric current flows in the order of B1 (18)→L1 (34)→D5a (220a)→S5b (210b)→B2 (20)→L2 (38)→LD (16, 17)→B1 (18). The electric energy charged in L1 (34) and L2 (38) is discharged and added to the output voltage of the batteries B1, B2 (boosting voltage operation) by the formed circuit R24.

In the charging process while regenerating power (shown in broken lines), a circuit R25 is formed in which an electric current flows in the order of LD (16, 17)→L2 (38)→B2 (20)→D5b (220b)→S5a (210a)→L1 (34)→B1 (18)→LD (16, 17). The regenerated power is supplied to B1 (18) and B2 (20), and electric energy is charged to L1 (34) and L2 (38), by the formed circuit R25).

<(2) Direct Series Connection>

In this connection mode, the connection state in FIG. 22 is maintained. Specifically, S1 (202) is fixed to OFF, S2 (204) is fixed to OFF, S3 (206) is fixed to OFF, S4 (208) is fixed to OFF, S5a (210a) and S5b (210b) are fixed to ON.

<(3-1) First Mode in Parallel Connection for Boosting and Stepping Down Voltage>

As described below, the second voltage converter 200 is provided with two modes in parallel connection for boosting and stepping down voltage. The first mode is described here. In this mode, the switching elements S5a, S5b (210a, 210b) are fixed to OFF, while S1 (202), S2 (204), S3 (206), and S4 (208) are turned ON and OFF.

In the first mode in parallel connection for boosting and stepping down voltage, the circuits formed in the charging process while driving a motor (shown in solid lines), which is a boosting voltage operation, and in the discharging process while regenerating power (shown in broken lines), which is a stepping down voltage operation, are respectively identical to the circuit formed in the charging process while driving a motor (shown in solid lines) and the discharging process while regenerating power (shown in broken lines) in the series connection for boosting and stepping down voltage shown in FIG. 21. The switching elements are turned ON and OFF as follows: S1 (202) is turned OFF, S2 (204) is turned ON, S3 (206) is turned OFF, S4 (72) is turned ON, and S5a (210a) and S5b (210b) are fixed to OFF.

Figure 23:
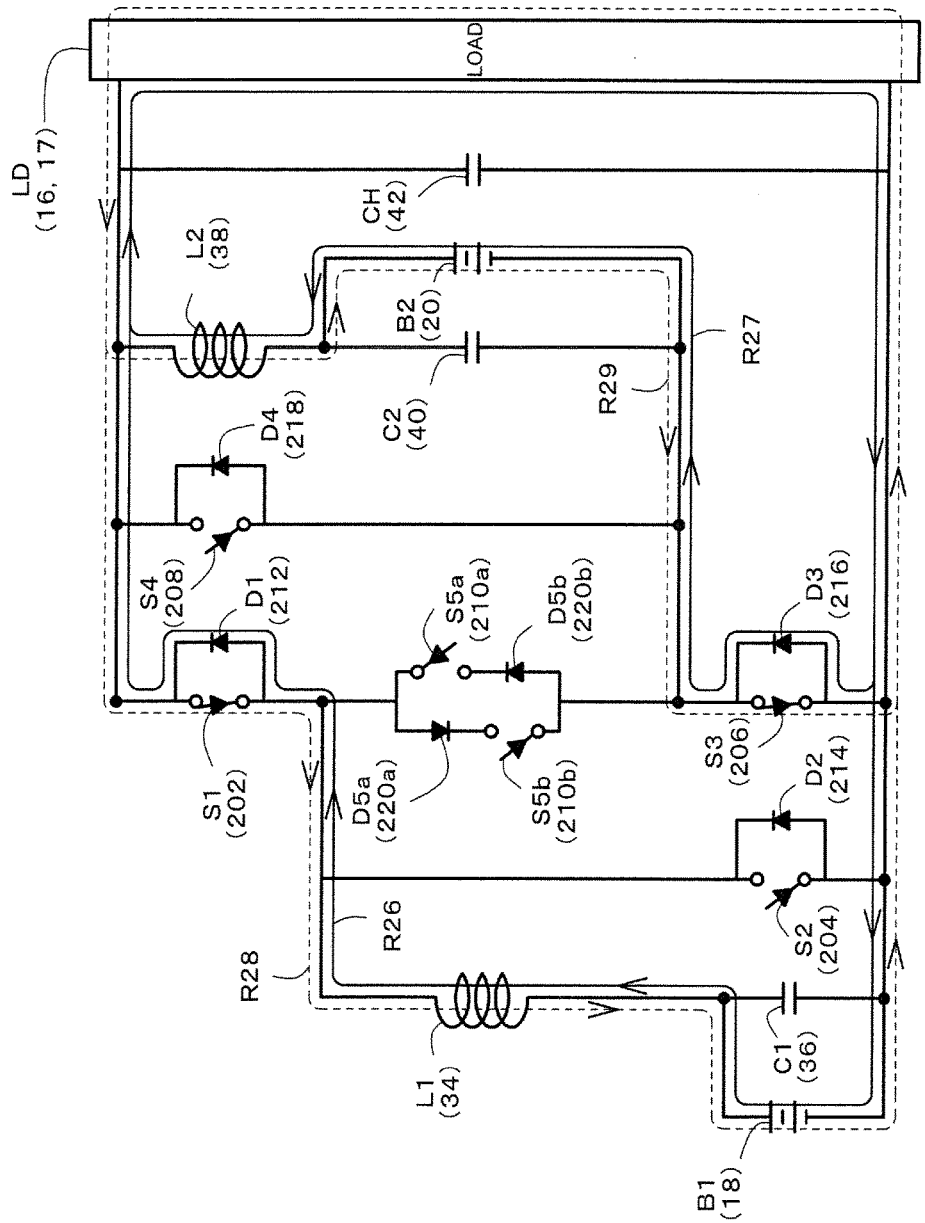
FIG. 23 is a schematic diagram for describing an operation (discharging while regenerating power and charging while regenerating power in a first mode in a parallel connection for boosting and stepping down voltage) of a voltage converter of an embodiment according to the present invention.

Among the processes in the first mode in the parallel connection for boosting and stepping down voltage, FIG. 23 shows a discharging process while driving a motor (shown in solid lines), which is a boosting voltage operation, and a charging process while regenerating power (shown in broken lines), which is a stepping down voltage operation, as examples. In these processes, S1 (202) is turned ON, S2 (204) is turned OFF, S3 (206) is turned ON, S4 (208) is turned OFF, and S5a (210a) and S5b (210b) are fixed to OFF.

In this state, in the discharging process while driving a motor (shown in solid lines), a circuit R26 is formed in which an electric current flows in the order of B1 (18)→L1 (34)→D1 (212)→LD (16, 17)→B1 (18). A circuit R27 in which an electric current flows in the order of B2 (20)→L2 (38)→LD (16, 17)→D3 (216)→B2 (20) is also formed. The electric energy charged in L1 (34) is discharged and added to the output voltage of the battery B1 (boosting voltage operation) by the formed circuit R26. Similarly, the electric energy charged in L2 (38) is discharged and added to the output voltage of the battery B2 by the formed circuit R27.

In the charging process while regenerating power (shown in broken lines), a circuit R28 is formed in which an electric current flows in the order of LD (16, 17)→S1 (202)→L1 (34)→B1 (18)→LD (16, 17). A circuit R29 in which an electric current flows in the order of LD (16, 17)→L2 (38)→B2 (20)→S3 (206)→LD (16, 17) is also formed. The regenerated power is supplied to B1 (18) and B2 (20) and electric energy is charged in L1 (34) and L2 (38) by the formed circuits R28, R29.

<(3-2) Second Mode in Parallel Connection for Boosting and Stepping Down Voltage>

Figure 24:
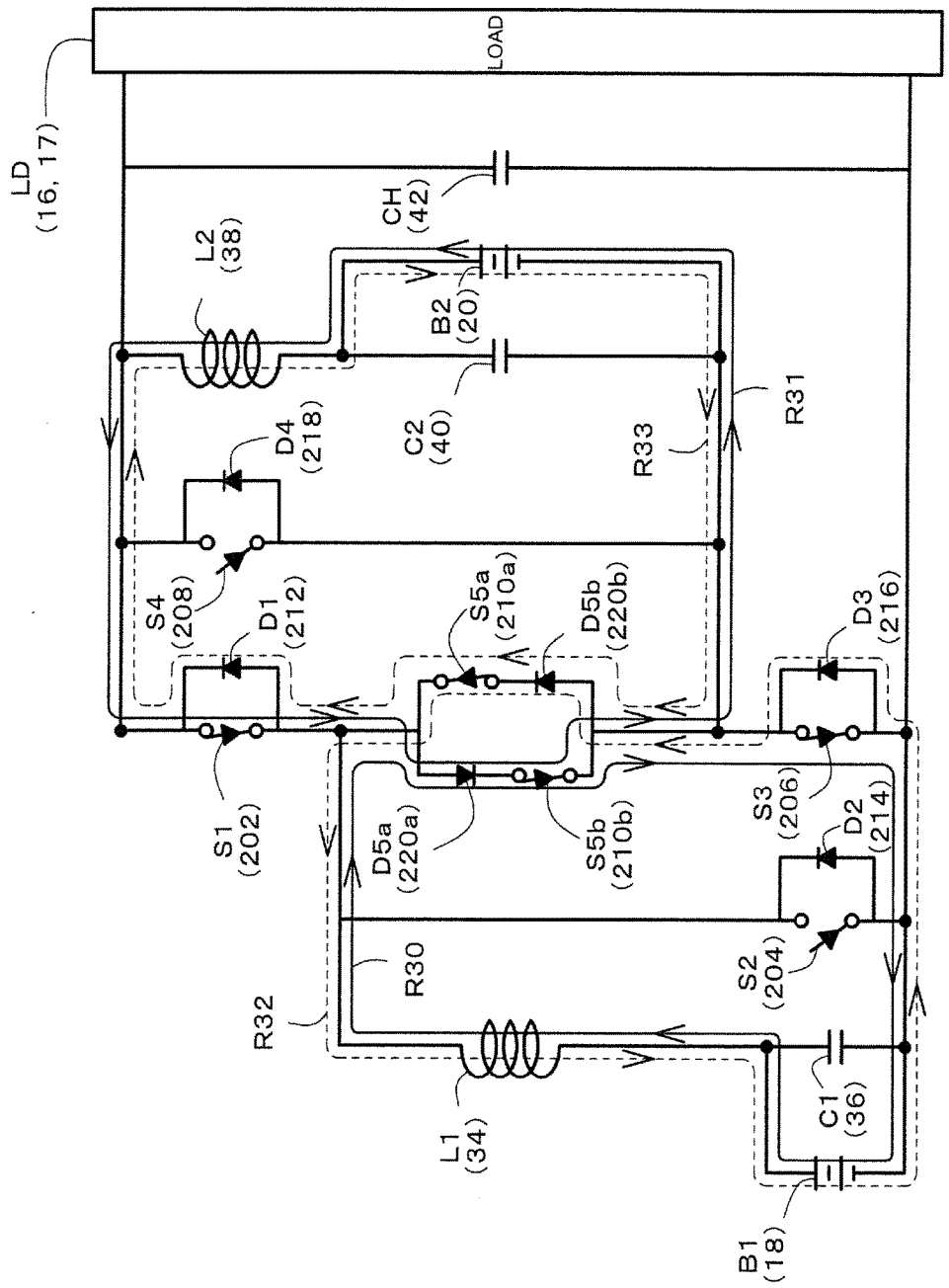
FIG. 24 is a schematic diagram for describing an operation (charging while driving a motor and discharging while regenerating power in a second mode in a parallel connection for boosting and stepping down voltage) of a voltage converter of an embodiment according to the present invention.
Figure 25:
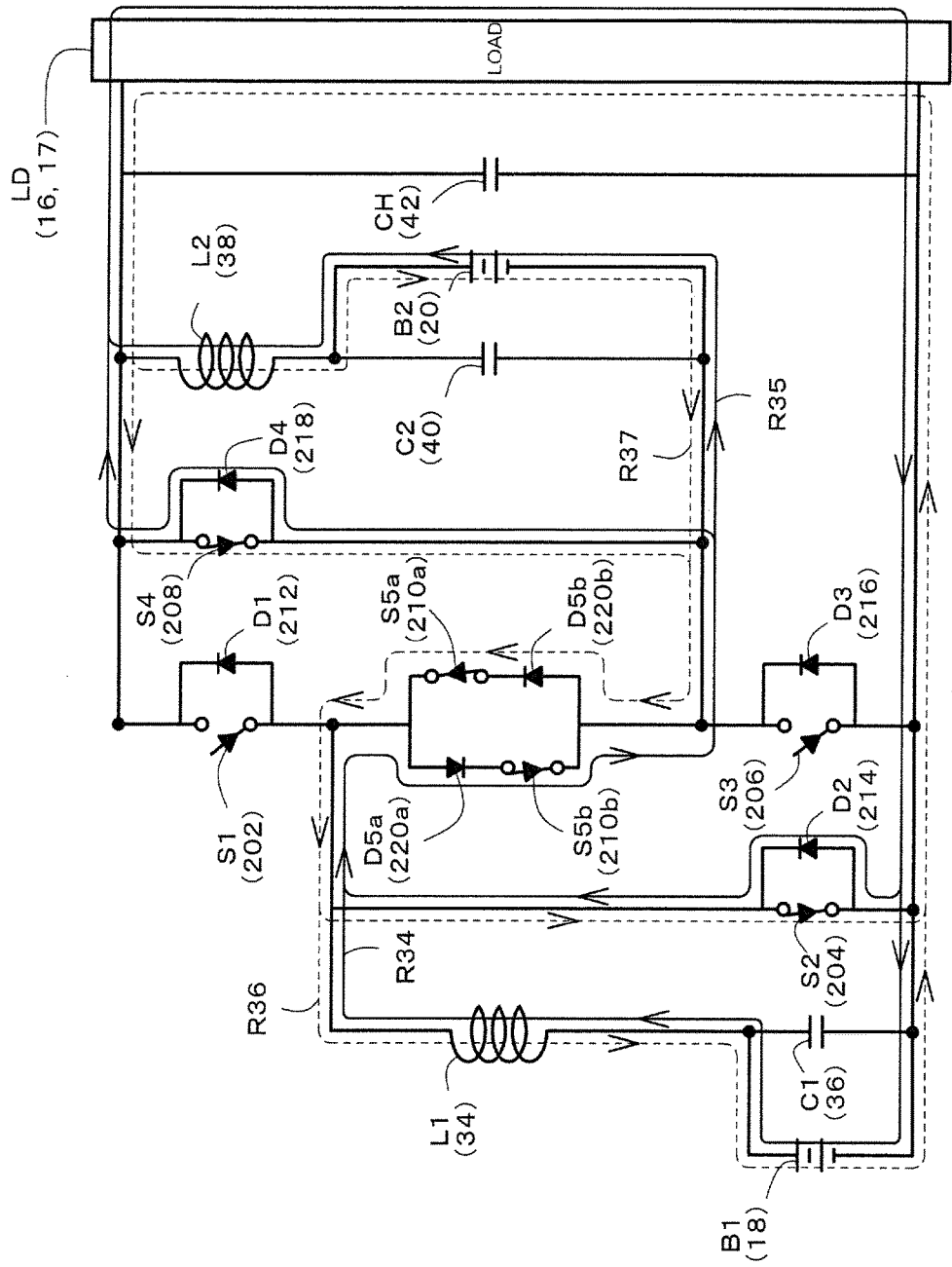
FIG. 25 is a schematic diagram for describing an operation (discharging while driving a motor and charging while regenerating power in a second mode in a parallel connection for boosting and stepping down voltage).

FIGS. 24 and 25 show the second mode in the parallel connection for boosting and stepping down voltage, as an example. In this mode, S5a, S5b (210a, 210b) are fixed to ON, while S1 (202), S2 (204), S3 (206), S4 (208) are turned ON and OFF.

Among the processes in the second mode in the parallel connection for boosting and stepping down voltage, FIG. 24 shows a charging process while driving a motor (shown in solid lines), which is a boosting voltage operation, and a discharging process while regenerating power (shown in broken lines), which is a stepping down voltage operation, as examples. In these processes, S1 (202) is turned ON, S2 (204) is turned OFF, S3 (206) is turned ON, S4 (208) is turned OFF, and S5a (210a) and S5b (210b) are fixed to ON.

In this state, in the charging process while driving a motor (shown in solid lines), a circuit R30 is formed in which an electric current flows in the order of B1 (18)→L1 (34)→D5a (220a)→S5b (210b)→S3 (206)→B1 (18). A circuit R31 in which an electric current flows in the order of B2 (20)→L2 (38)→S1 (202)→D5a (220a)→S5b (210b)→B2 (20) is also formed. Electric energy (electromagnetic energy) is charged in L1 (34) by the formed circuit R30. Similarly, electric energy is charged in L2 (38) by the formed circuit R31.

In the discharging process while regenerating power (shown in broken lines), a circuit R32 is formed in which an electric current flows in the order of L1 (34)→B1 (18)→D3 (216)→D5b (220b)→S5a (210a)→L1 (34). A circuit R33 in which an electric current flows in the order of L2 (38)→B2 (20)→D5b (220b)→S5a (210a)→D1 (212)→L2 (38) is also formed. The regenerated power is supplied to B1 (18) and B2 (20) and electric energy is charged in L1 (34) and L2 (38) by the formed circuits R32, R33.

Among the processes in the second mode in the parallel connection for boosting and stepping down voltage, FIG. 25 shows a discharging process while driving a motor (shown in solid lines), which is a boosting voltage operation, and a charging process while regenerating power (shown in broken lines), which is a stepping down voltage operation, as examples. In these processes, S1 (202) is turned OFF, S2 (204) is turned ON, S3 (206) is turned OFF, S4 (208) is turned ON, and S5a (210a) and S5b (210b) are fixed to ON.

In this state, in the discharging process while driving a motor (shown in solid lines), a circuit R34 is formed in which an electric current flows in the order of B1 (18)→L1 (34)→D5a (220a)→S5b (210b)→D4 (218)→LD (16, 17)→B1 (18). A circuit R35 in which an electric current flows in the order of B2 (20)→L2 (38)→LD (16, 17)→D2 (214)→D5a (220a)→S5b (210b)→B2 (20) is also formed. The electric energy charged in L1 (34) is discharged and added to the output voltage of the battery B1 (boosting voltage operation) by the formed circuit R34. Similarly, the electric energy charged in L2 (38) is discharged and added to the output voltage of the battery B2 by the formed circuit R35.

In the charging process while regenerating power (shown in broken lines), a circuit R36 is formed in which an electric current flows in the order of LD (16, 17)→S4 (208)→D5b (220b)→S5a (210a)→L1 (34)→B1 (18)→LD (16, 17). A circuit R37 in which an electric current flows in the order of LD (16, 17)→L2 (38)→B2 (20)→D5b (220b)→S5a (210a) →S2 (204)→LD (16, 17) is also formed. The regenerated power is supplied to B1 (18) and B2 (20) and electric energy is charged in L1 (34) and L2 (38) by the formed circuits R36, R37.

The connection switch control by the second voltage converter 200 to switch the series connection between the first battery 18 and the second battery 20 to a parallel connection may be fundamentally identical to the connection switch control by the first voltage converter 22. These connection switch controls are different in the ON/OFF patterns of the switching elements between the first voltage converter 22 and the second voltage converter 200. The ON/OFF patters can be respectively determined based on the above described connection pattern.

These connection switch controls are also different in that, in the second voltage converter 200, two modes are available in the parallel connection for boosting and stepping voltage. Therefore, regarding the parallel connection, for example, an additional determination flow may be provided to determine which of the two modes in the parallel connection for boosting and stepping down voltage should be selected when the serial connection is switched to a parallel connection in the respective flow charts shown in FIGS. 12, 14, 16, 17, and 19.

One of the two modes in the parallel connection for boosting and stepping down voltage may be selected by, for example, the switching elements which are turned ON. By turning ON the switching elements, an electric current flows through these switching elements, and thereby the switching elements are heated. Thus, temperature sensors (not shown) may be provided for the switching elements 202, 204, 206, 208, 210a, 210b, and a mode in the parallel connection for boosting and stepping down voltage may be selected so as not to use the switching elements which have a relatively high temperature.

Specifically, in the first mode in the parallel connection for boosting and stepping down voltage shown in FIGS. 21 and 23, the switching elements S5a, S5b (210a, 210b) are fixed to OFF, while in the second mode in the parallel connection for boosting and stepping down voltage shown in FIGS. 24 and 25, the switching elements S5a, S5b (210a, 210b) are fixed to ON. By using this difference, when the switching elements S5a, S5b (210a, 210b) have a higher temperature than the other switching elements, the first mode in which these switching elements S5a, S5b (210a, 210b) are fixed to OFF can be selected to avoid the use of these switching elements.

It should be noted that the present invention should not be limited to the above described embodiments. The present invention includes any changes and modifications which do not depart from the technical scope and spirit of the present invention defined in the claims.

What is claimed is:
1. An electric drive vehicle comprising:
   a voltage converter which is capable of performing a bidirectional voltage conversion between two DC power supplies and a rotary electric machine, and a connection switch that switches a connection of the two power supplies between a series connection and a parallel connection with respect to the rotary electric machine; and a controller which controls the voltage conversion of the voltage converter and the connection switch of the power supplies, wherein the controller sets the connection between the two power supplies to the parallel connection when an estimated value of an output electric current in accordance with a torque command to the rotary electric machine exceeds a tolerable electric current value of at least one of the two power supplies, wherein a first limit value and a second limit value are set in the controller to limit an electric power command value in accordance with the torque command to the rotary electric machine, wherein the second limit value is set higher than the first limit value, and wherein the controller switches from the first limit value to the second limit value in response to the connection switch by the controller that switches the connection between the two power supplies from the series connection to the parallel connection.

2. An electric drive vehicle comprising:

a voltage converter which is capable of performing a bidirectional voltage conversion between two DC power supplies and a rotary electric machine, and a connection switch that switches a connection of the two power supplies between a series connection and a parallel connection with respect to the rotary electric machine; and a controller which controls the voltage conversion of the voltage converter and the connection switch of the power supplies, wherein the controller sets the connection between the two power supplies to the parallel connection when a changed amount in torque command values to the rotary electric machine exceeds a threshold, wherein a first limit value and a second limit value are set in the controller to limit an electric power command value in accordance with a torque command to the rotary electric machine, wherein the second limit value is set higher than the first limit value, and wherein the controller switches the limit value from the first limit value to the second limit value in response to the connection switch by the controller that switches the connection between the two power supplies from the series connection to the parallel connection.

3. An electric drive vehicle comprising:

a voltage converter which is capable of performing a bidirectional voltage conversion between two DC power supplies and a rotary electric machine, and a connection switch that switches a connection of the two power supplies between a series connection and a parallel connection with respect to the rotary electric machine; and a controller which controls the voltage conversion of the voltage converter and the connection switch of the power supplies, wherein the controller sets the connection between the two power supplies to the parallel connection when a changed amount in rotation speed of the rotary electric machine exceeds a threshold, wherein a first limit value and a second limit value are set in the controller to limit an electric power command value in accordance with a torque command to the rotary electric machine, wherein the second limit value is set higher than the first limit value, and wherein the controller switches from the first limit value to the second limit value in response to the connection switch by the controller that switches the connection between the two power supplies from the series connection to the parallel connection.

4. An electric drive vehicle comprising:

a voltage converter which is capable of performing a bidirectional voltage conversion between two DC power supplies and a rotary electric machine, and a connection switch that switches a connection of the two power supplies between a series connection and a parallel connection with respect to the rotary electric machine; and a controller which controls the voltage conversion of the voltage converter and the connection switch of the power supplies, wherein the controller sets the connection between the two power supplies to the parallel connection when drive wheels slip, wherein a first limit value and a second limit value are set in the controller to limit an electric power command value in accordance with a torque command to the rotary electric machine, wherein the second limit value is set higher than the first limit value, and wherein the controller switches from the first limit value to the second limit value in response to the connection switch by the controller that switches the connection between the two power supplies from the series connection to the parallel connection.

5. An electric drive vehicle comprising:

a voltage converter which is capable of performing a bidirectional voltage conversion between two DC power supplies and a rotary electric machine, and a connection switch that switches a connection of the two power supplies between a series connection and a parallel connection with respect to the rotary electric machine; and a controller which controls the voltage conversion of the voltage converter and the connection switch of the power supplies, wherein the electric drive vehicle is mounted with an internal combustion engine as a drive source, wherein the internal combustion engine is driven initially with an output torque from the rotary electric machine, and wherein the controller sets the connection between the two power supplies to the parallel connection in response to an output of a start command of the internal combustion engine, wherein a first limit value and a second limit value are set in the controller to limit an electric power command value in accordance with a torque command to the rotary electric machine, wherein the second limit value is set higher than the first limit value, and wherein the controller switches from the first limit value to the second limit value in response to the connection switch by the controller that switches the connection between the two power supplies from the series connection to the parallel connection.

6. An electric drive vehicle comprising:
a voltage converter which is capable of performing a bidirectional voltage conversion between two DC power supplies and a rotary electric machine, and a connection switch that switches a connection of the two power supplies between a series connection and a parallel connection with respect to the rotary electric machine; and
a controller which controls the voltage conversion of the voltage converter and the connection switch of the power supplies,
wherein the controller sets the connection between the two power supplies to the parallel connection when a vehicle control which is performed when drive wheels slip while being driven is turned OFF,
wherein a first limit value and a second limit value are set in the controller to limit an electric power command value in accordance with a torque command to the rotary electric machine,
wherein the second limit value is set higher than the first limit value, and
wherein the controller switches from the first limit value to the second limit value in response to the connection switch by the controller that switches the connection between the two power supplies from the series connection to the parallel connection.

7. An electric drive vehicle comprising:
a voltage converter which is capable of performing a bidirectional voltage conversion between two DC power supplies and a rotary electric machine, and a connection switch that switches a connection of the two power supplies between a series connection and a parallel connection with respect to the rotary electric machine; and
a controller which controls the voltage conversion of the voltage converter and the connection switch of the power supplies,
wherein the controller sets the connection between the two power supplies to the parallel connection when a vehicle control which is performed when drive wheels slip while being driven or braked is faulty,
wherein a first limit value and a second limit value are set in the controller to limit an electric power command value in accordance with a torque command to the rotary electric machine,
wherein the second limit value is set higher than the first limit value, and
wherein the controller switches from the first limit value to the second limit value in response to the connection switch by the controller that switches the connection between the two power supplies from the series connection to the parallel connection.

* * * * *